United States Patent
Cho et al.

(10) Patent No.: US 10,354,530 B2
(45) Date of Patent: Jul. 16, 2019

(54) MOBILE TERMINAL FOR SHARING IMAGE WITH NEARBY BLACKBOX DEVICE AND METHOD FOR CONTROLLING THE SAME

(71) Applicant: LG ELECTRONICS INC., Seoul (KR)

(72) Inventors: Taehoon Cho, Seoul (KR); Jie Seol, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 645 days.

(21) Appl. No.: 14/979,041

(22) Filed: Dec. 22, 2015

(65) Prior Publication Data

US 2016/0379496 A1 Dec. 29, 2016

(30) Foreign Application Priority Data

Jun. 23, 2015 (KR) .................. 10-2015-0088826

(51) Int. Cl.

| | |
|---|---|
| *G06Q 20/10* | (2012.01) |
| *G06F 3/0488* | (2013.01) |
| *G08G 1/14* | (2006.01) |
| *G07C 1/30* | (2006.01) |
| *G07C 5/08* | (2006.01) |
| *G08G 1/13* | (2006.01) |

(52) U.S. Cl.
CPC ........... *G08G 1/144* (2013.01); *G06F 3/0488* (2013.01); *G06Q 20/102* (2013.01); *G07C 1/30* (2013.01); *G07C 5/0866* (2013.01); *G08G 1/13* (2013.01)

(58) Field of Classification Search
CPC . G08G 1/144; G08G 1/13; G07C 1/30; G07C 5/0866; G06F 3/0488; G06Q 20/102
See application file for complete search history.

(56) References Cited

U.S. PATENT DOCUMENTS

| | | | | |
|---|---|---|---|---|
| 7,164,117 | B2 * | 1/2007 | Breed ............... | B60R 21/01516 |
| | | | | 250/208.1 |
| 8,996,234 | B1 * | 3/2015 | Tamari ................ | G07C 5/0808 |
| | | | | 701/29.3 |
| 9,298,575 | B2 * | 3/2016 | Tamari ............... | G06F 11/3013 |
| 9,505,494 | B1 * | 11/2016 | Marlow ............... | B64C 39/024 |
| 9,633,318 | B2 * | 4/2017 | Plante .................. | G06Q 10/00 |
| 2002/0003571 | A1 * | 1/2002 | Schofield ............. | B60C 23/00 |
| | | | | 348/148 |

(Continued)

FOREIGN PATENT DOCUMENTS

| | | |
|---|---|---|
| EP | 2267681 A1 | 12/2010 |
| EP | 2800404 A2 | 11/2014 |

*Primary Examiner* — Behrang Badii
*Assistant Examiner* — Daniel L Greene
(74) *Attorney, Agent, or Firm* — Birch, Stewart, Kolasch & Birch, LLP

(57) ABSTRACT

A mobile terminal including a touchscreen configured to display a map of a parking lot including a plurality of parking spaces; a wireless communication unit configured to communicate with at least one black box device of a corresponding vehicle parked in the parking lot; and a controller configured to identify a location of the at least one black box device and a location of the corresponding vehicle parked in the parking lot based on the communication with the least one black box device, and display the identified location of the at least one black box device and the identified location of the corresponding vehicle on the map of the parking lot.

8 Claims, 20 Drawing Sheets

(56) References Cited

U.S. PATENT DOCUMENTS

| | | | |
|---|---|---|---|
| 2003/0162536 A1 | 8/2003 | Panico | |
| 2008/0079554 A1 | 4/2008 | Boice | |
| 2012/0066144 A1* | 3/2012 | Berkvens | G06Q 10/00 705/345 |
| 2012/0190386 A1* | 7/2012 | Anderson | G01C 15/04 455/456.3 |
| 2013/0117078 A1* | 5/2013 | Weik, III | G06Q 10/00 705/13 |
| 2013/0273968 A1* | 10/2013 | Rhoads | G06F 17/30244 455/556.1 |
| 2014/0136414 A1* | 5/2014 | Abhyanker | G06Q 50/28 705/44 |
| 2014/0183269 A1* | 7/2014 | Glaser | G06F 21/32 235/492 |
| 2014/0309789 A1* | 10/2014 | Ricci | B60Q 1/00 700/276 |
| 2014/0324247 A1 | 10/2014 | Jun | |
| 2015/0141043 A1* | 5/2015 | Abramson | G01C 21/34 455/456.1 |
| 2015/0170518 A1 | 6/2015 | Rodriguez Garza | |
| 2016/0266733 A1* | 9/2016 | Alon | H04L 67/18 |

* cited by examiner

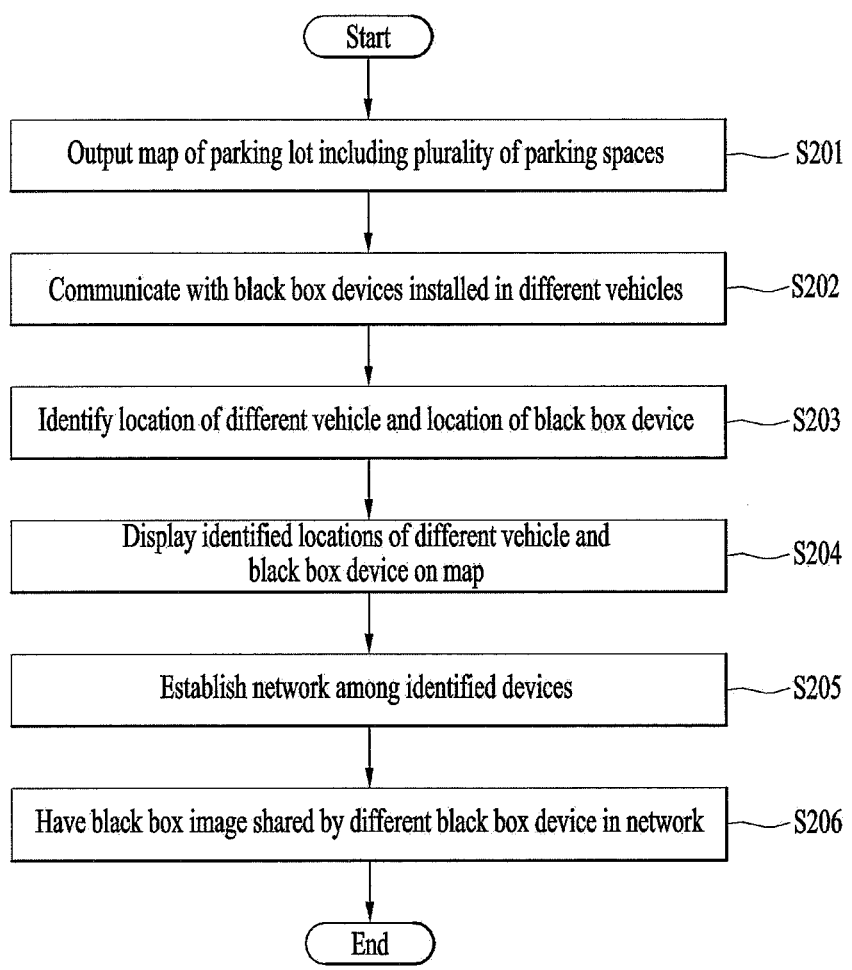

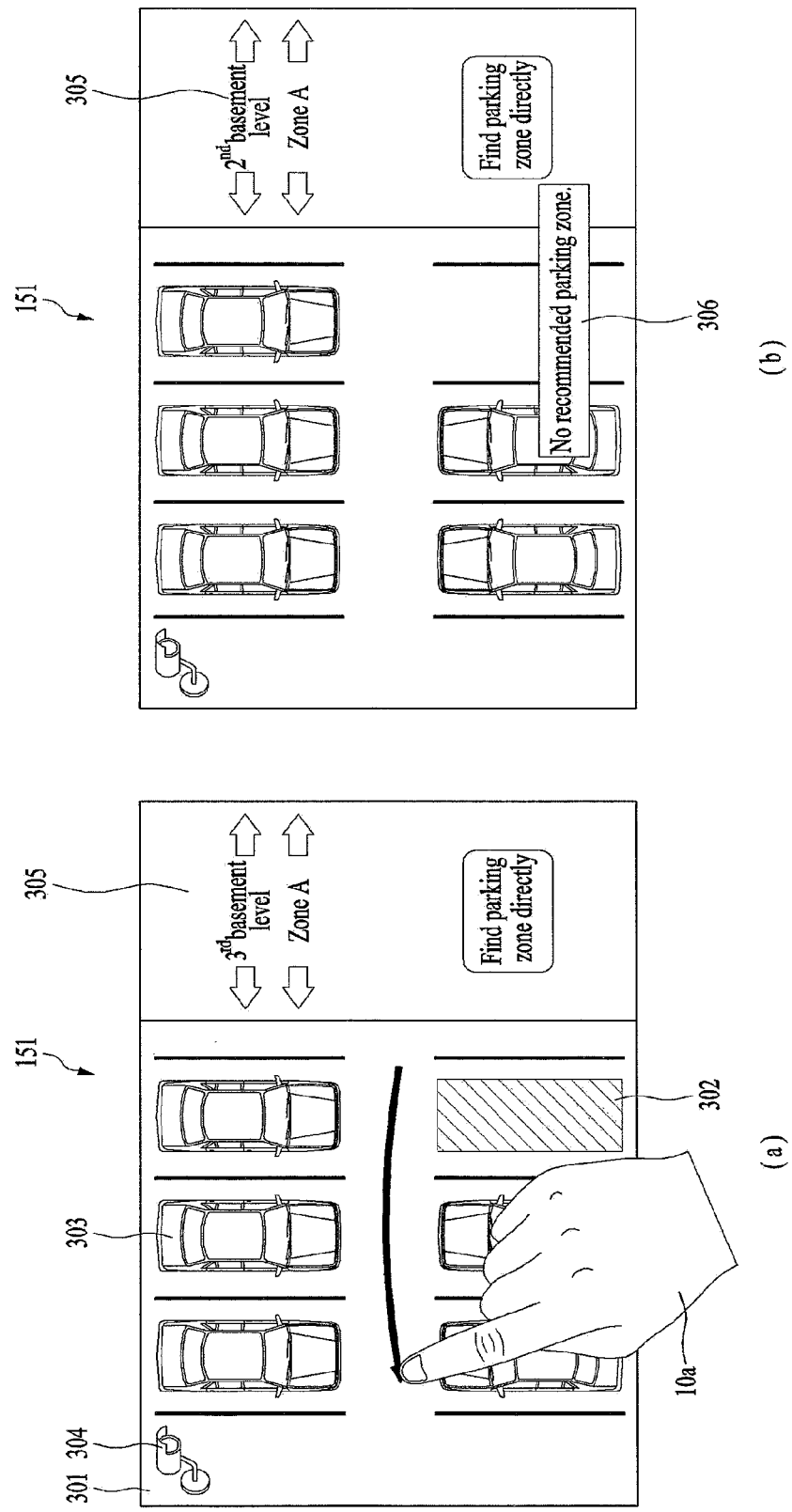

FIG. 10
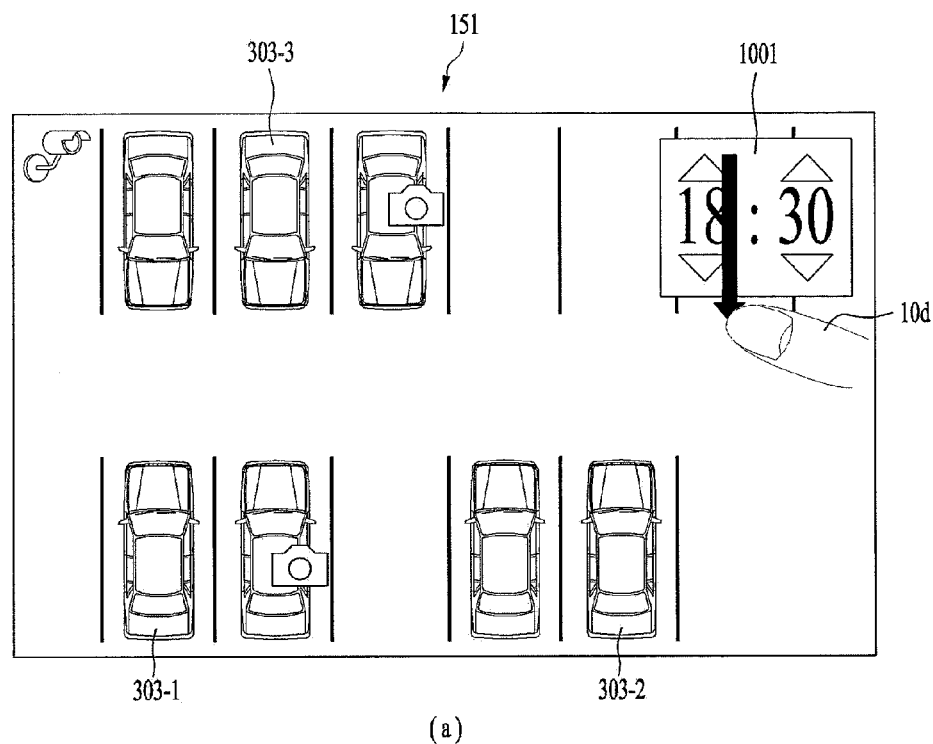
(a)
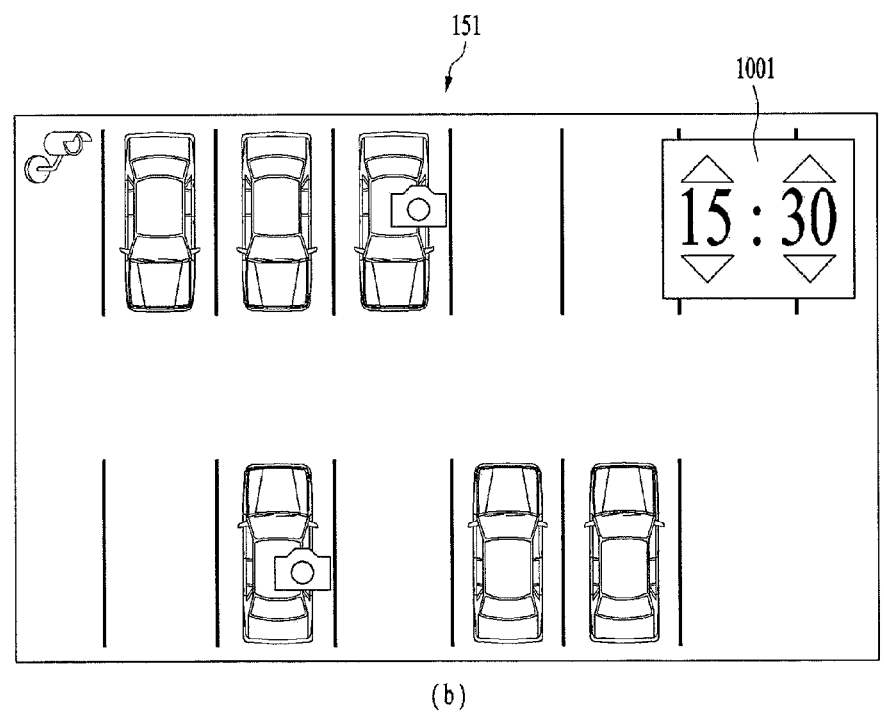
(b)

FIG. 11
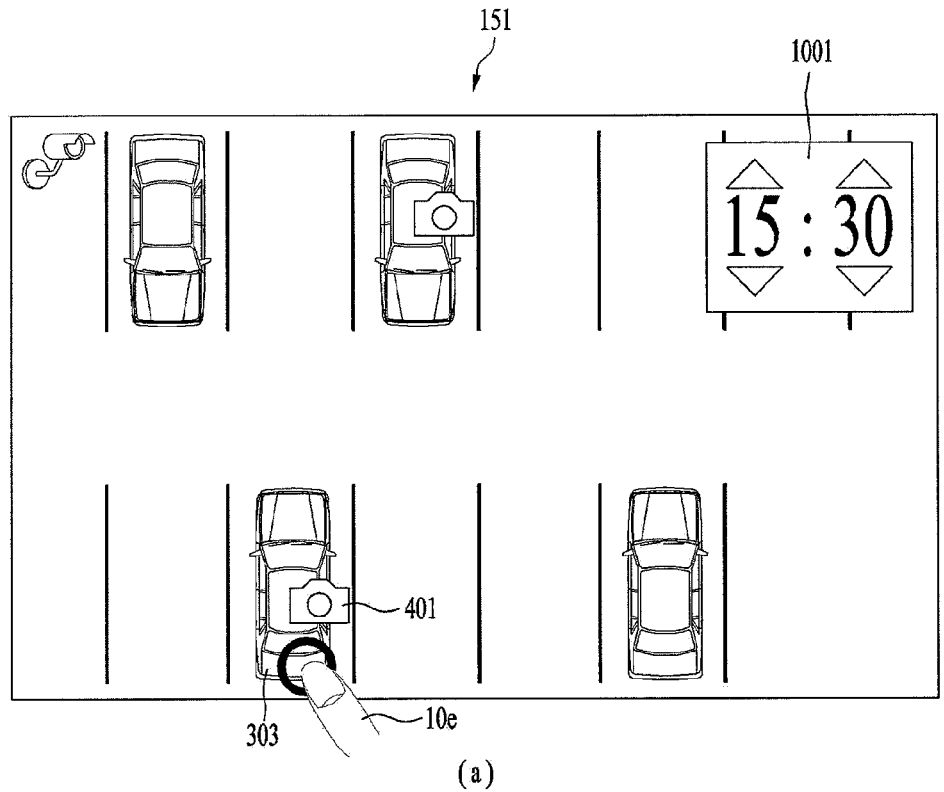
(a)
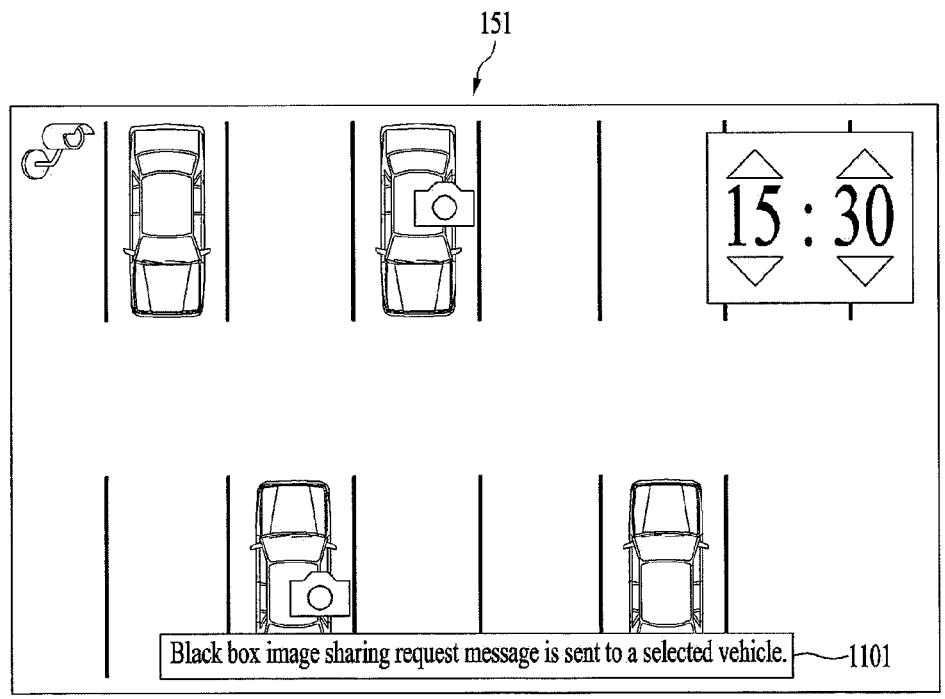
(b)

FIG. 12
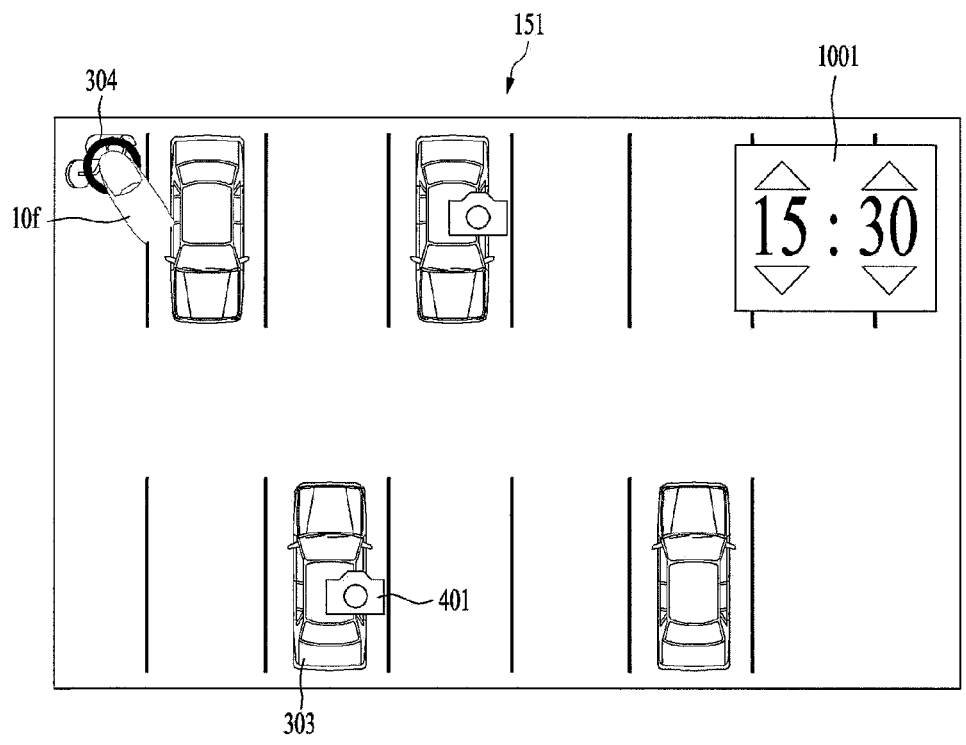
(a)
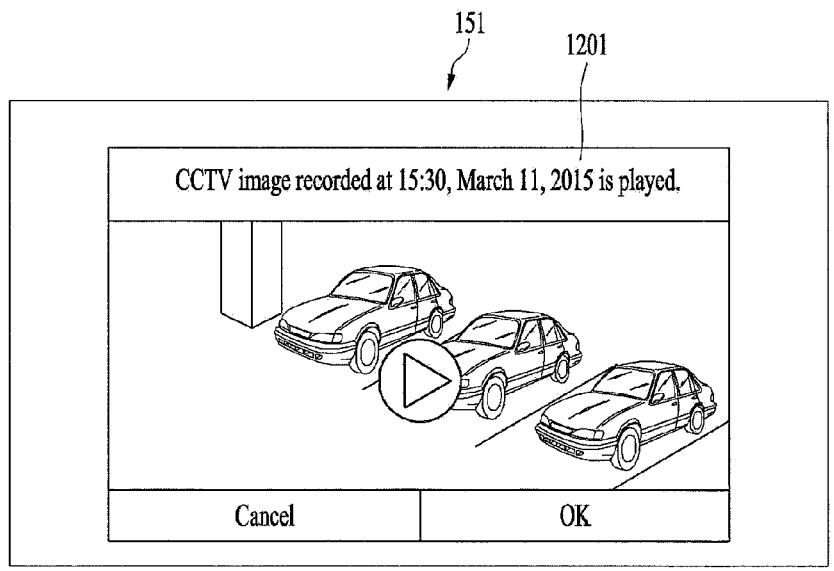
(b)

FIG. 13
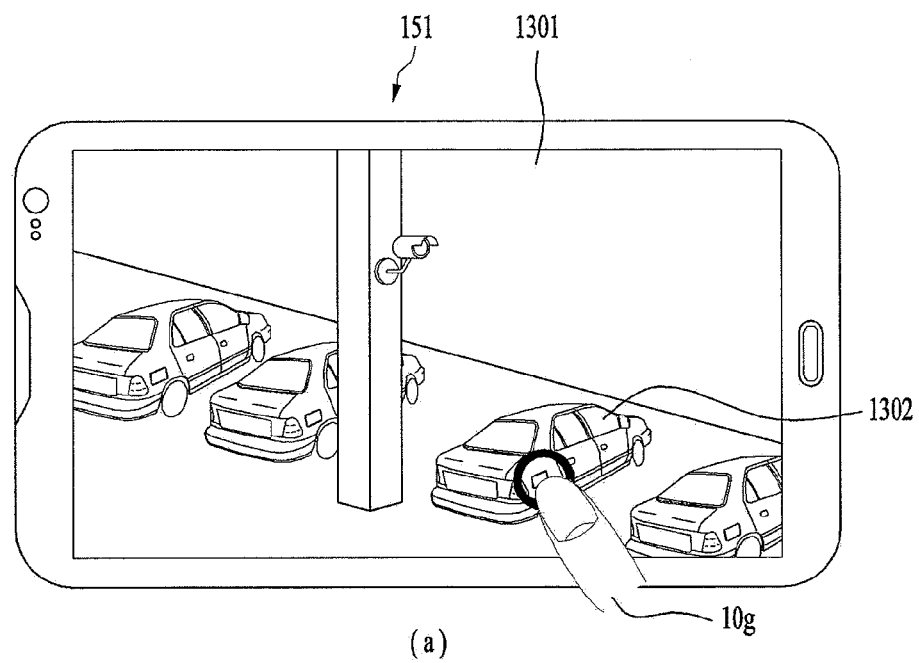
(a)
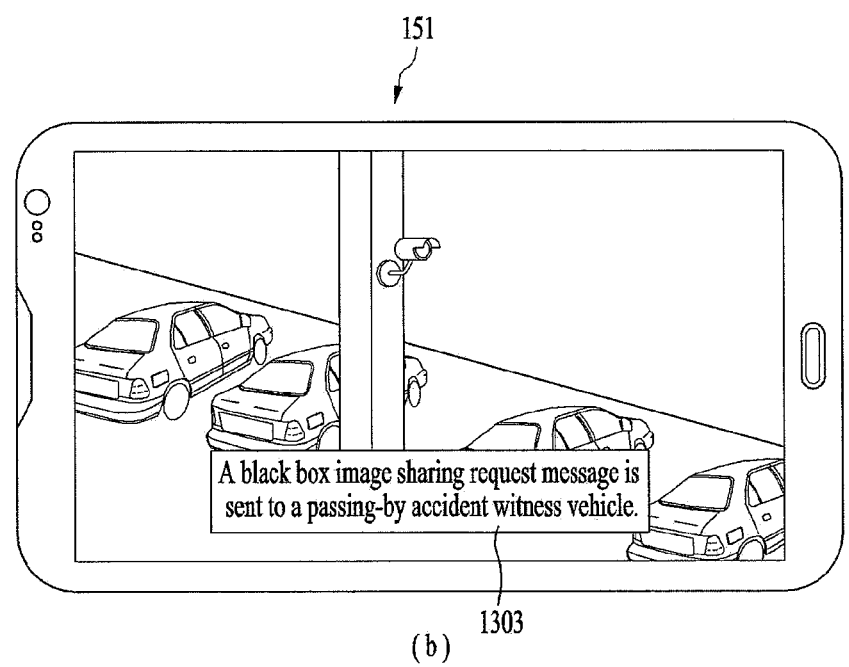
(b)

FIG. 14
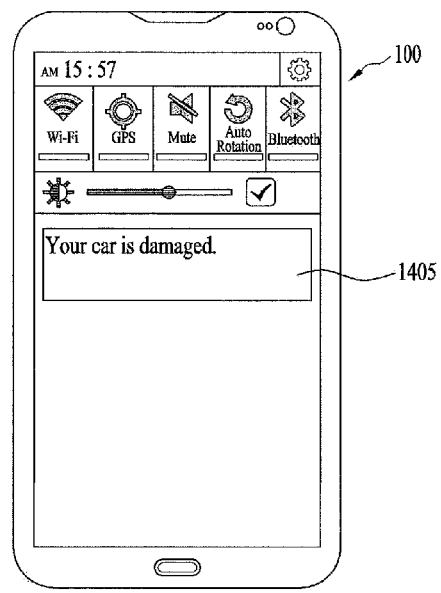
(a)
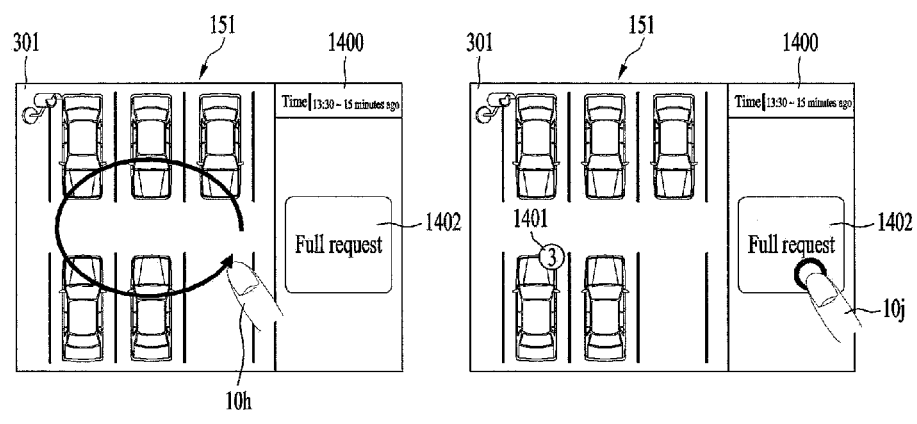
(b)                         (c)

FIG. 17
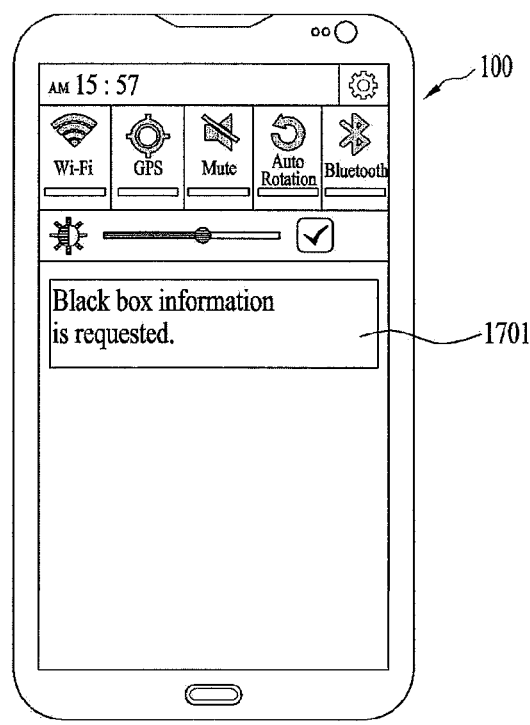
(a)
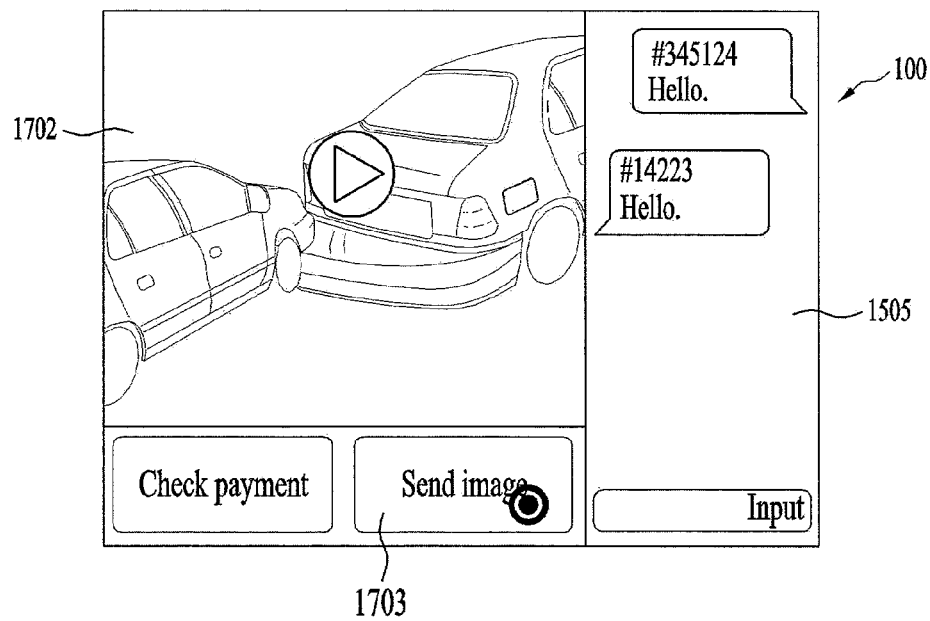
(b)

FIG. 19
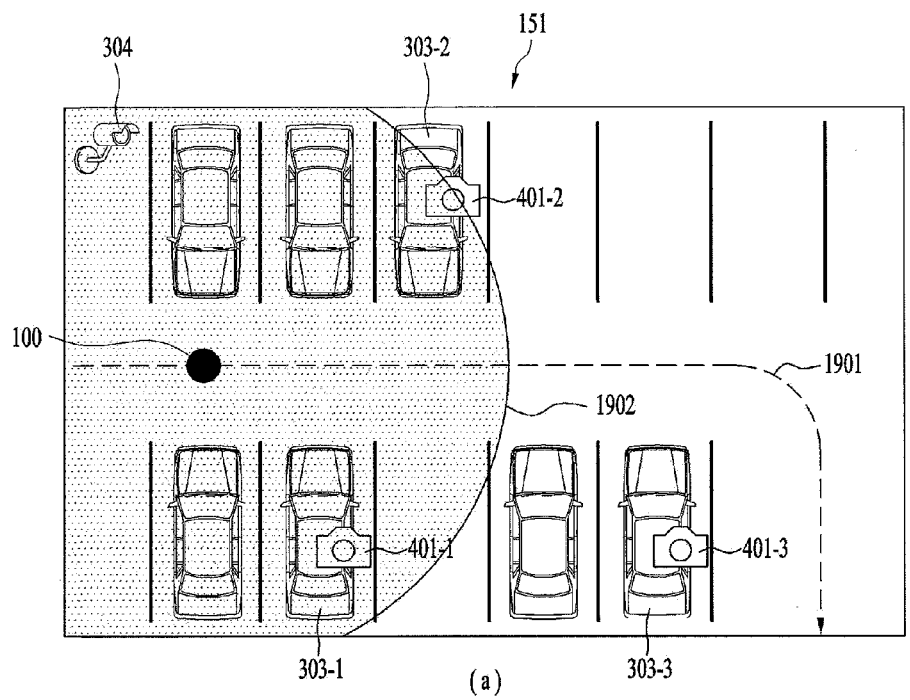
(a)
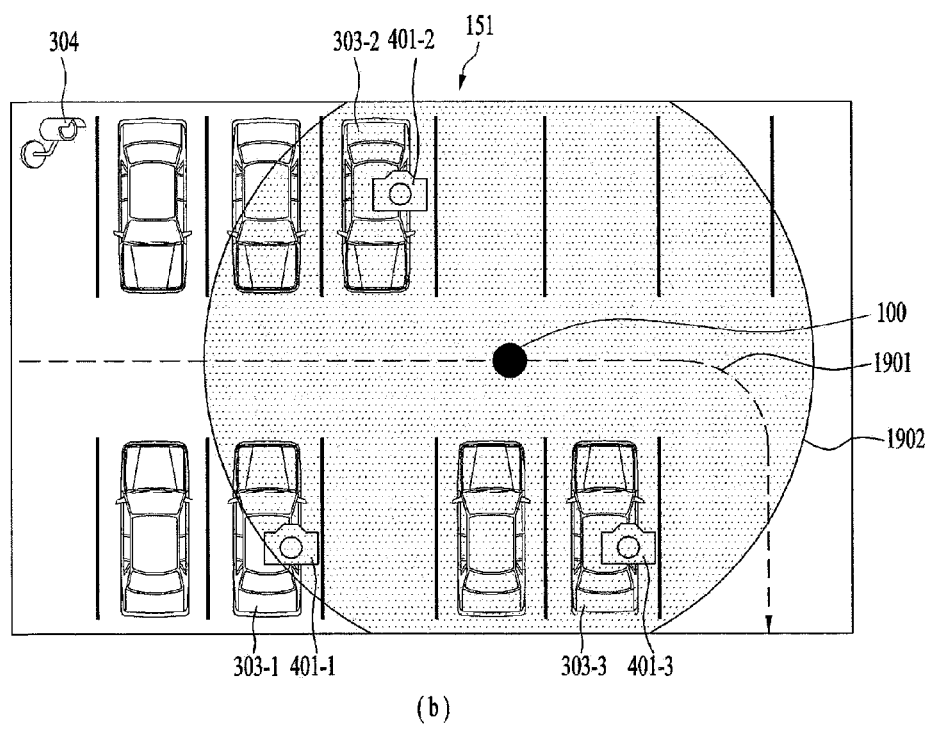
(b)

FIG. 20
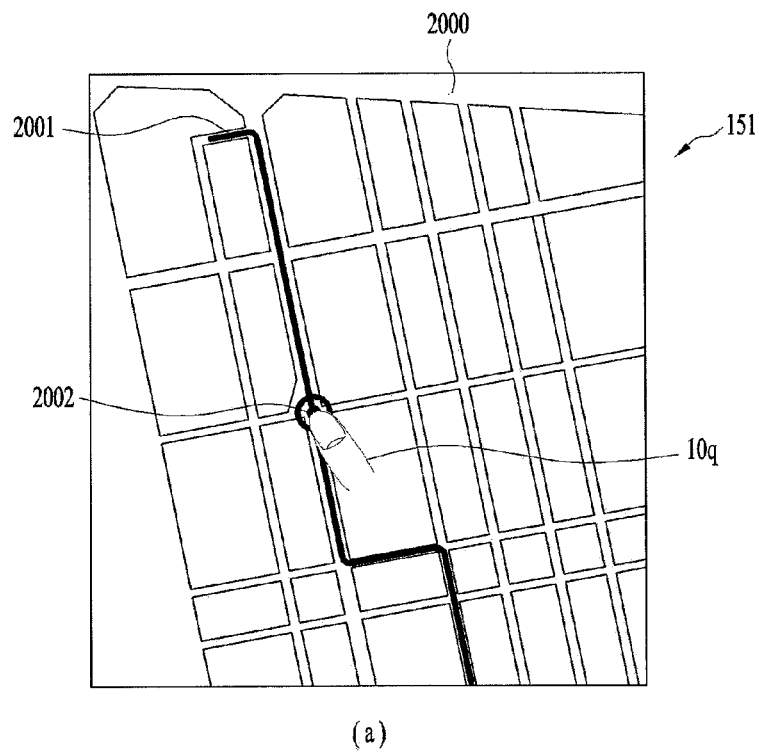
(a)
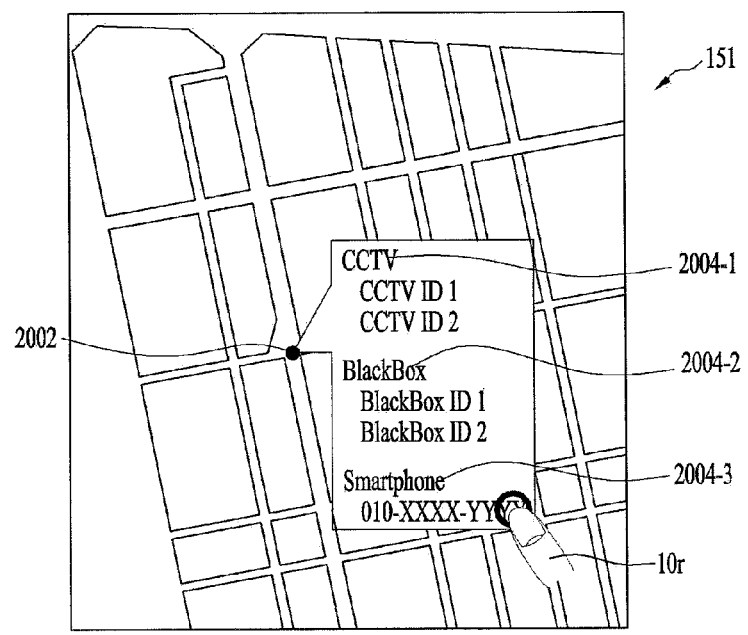
(b)

MOBILE TERMINAL FOR SHARING IMAGE WITH NEARBY BLACKBOX DEVICE AND METHOD FOR CONTROLLING THE SAME

Pursuant to 35 U.S.C. § 119(a), this application claims priority to Korean Patent Application No. 10-2015-0088826 filed on Jun. 23, 2015 in Korea, the entire contents of which is hereby incorporated by reference in its entirety.

BACKGROUND OF THE INVENTION

Field of the Invention

The present invention relates to a mobile terminal, and more particularly, to a mobile terminal and controlling method thereof. Although the present invention is suitable for a wide scope of applications, it is particularly suitable for identifying black box devices located nearby and facilitating an image to be shared with the devices.

Discussion of the Related Art

Terminals may be generally classified as mobile/portable terminals or stationary terminals. Mobile terminals may also be classified as handheld terminals or vehicle mounted terminals. Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players.

More recently, mobile terminals have been configured to receive broadcast and multicast signals which permit viewing of content such as videos and television programs. Efforts are ongoing to support and increase the functionality of mobile terminals. Such efforts include software and hardware improvements, as well as changes and improvements in the structural components.

Regarding vehicle mounted terminals, a mobile terminal for photographing images on a stopped or driven vehicle is called a black box device. As legal evidence for vehicle damage or a traffic accident, black box images captured by the black box device can be used. As the black box devices are widely popularized, the black box images are utilized not only for the prevention/investigation of vehicle crimes but also for the prevention/investigation of other crimes.

Since the black box images play a role more important than a witness statement in determining circumstances at the time of accident, it is useful to secure a black box image of a witness vehicle as well as a black box image of an accident vehicle. Although there are many black box images of witness vehicles having captured the accident circumstances, it is difficult to check whether the accident circumstances are captured unless an owner of the corresponding image confirms. Particularly, for a black box image of a parked or stopped car, if an owner of the image is not present at the accident spot, the owner cannot confirm whether the image is captured.

Moreover, regarding a black box image of a witness vehicle, it is inconvenient for an owner of the black box image to personally share the corresponding black box image with others. Particularly, since a black box is not equipped with a wireless communication function, an image saved in a memory is shared by checking and sending the image after physically connecting the black box to a computer.

Thus, such a method is not cooperative for many owners to share their black box images. Due to these reasons, it is difficult to secure or obtain necessary images. Thus, the demands for a control method of sharing a black box image more easily and effectively and a mobile terminal for the same are increasingly rising.

SUMMARY OF THE INVENTION

Accordingly, an object of the present invention is to address the above-noted and other problems.

Another object of the present invention is to provide a mobile terminal and controlling method thereof, by which a parking space currently captured by a black box device of another vehicle can be recommended.

Technical tasks obtainable from the present invention are non-limited by the above-mentioned technical tasks. And, other unmentioned technical tasks can be clearly understood from the following description by those having ordinary skill in the technical field to which the present invention pertains. Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to one embodiment of the present invention includes a touchscreen configured to output a map of a parking lot including a plurality of parking spaces, a wireless communication unit configured to communicate with at least one black box device, a sensing unit configured to identify a location of the at least one black box device and a location of at least one vehicle parked in the parking lot, and a controller displaying the identified location of the at least one vehicle and the identified location of the at least one black box device on the output map of the parking lot.

In another aspect of the present invention, as embodied and broadly described herein, a method of controlling a mobile terminal according to another embodiment of the present invention may include the steps of outputting a map of a parking lot including a plurality of parking spaces, communicating with at least one black box device, identifying a location of the at least one black box device and a location of at least one vehicle parked in the parking lot, and displaying the identified location of the at least one vehicle and the identified location of the at least one black box device on the output map of the parking lot.

In further aspect of the present invention, as embodied and broadly described herein, a mobile terminal according to further embodiment of the present invention may include a memory, a location information module configured to detect a location of the mobile terminal, a sensing unit configured to recognize at least one external terminal around the mobile terminal, and a controller controlling the memory to store at least one or more identification information received from at least one or more external terminals recognized along a moving route of the mobile terminal based on the detected location, the controller, if an input for specifying a prescribed location is received, outputting the identification information received from an external terminal recognized at the specified prescribed location among the saved at least one or more identification information.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 2 is a flowchart illustrating a control method of recognizing terminals including a black box device installed in a parked vehicle, CCTVs and/or the like and establishing a network among the recognized terminals according to one embodiment of the present invention;

FIG. 3 is a diagram illustrating one example of a parking lot map, which is output when a mobile terminal enters a parking lot, according to one embodiment of the present invention;

FIG. 10 is a diagram illustrating a control method of receiving a time setting from a user and outputting a parking lot map corresponding to a set time slot according to one embodiment of the present invention;

FIG. 11 is a diagram illustrating a control method of making a request for an image to another vehicle on a parking lot map corresponding to a set prescribed time according to one embodiment of the present invention;

FIG. 12 is a diagram illustrating a control method of reading a shot image per time slot according to one embodiment of the present invention;

FIG. 13 is a diagram illustrating a control method of sending an image request message to another vehicle in an image in the course of playing a CCTV image or a black box image according to one embodiment of the present invention;

FIG. 14 is a diagram illustrating a control method of sending an image sharing request message to a plurality of vehicles according to one embodiment of the present invention;

FIG. 17 is a diagram illustrating a control method for an image sharer side terminal to share an image according to one embodiment of the present invention;

FIG. 19 is a diagram illustrating a control method of recognizing a nearby external terminal along a moving route of a mobile terminal according to one embodiment of the present invention; and FIG. 20 is a diagram illustrating a control method of checking a nearby recognized terminal by selecting a prescribed point on a moving path according to one embodiment of the present invention.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
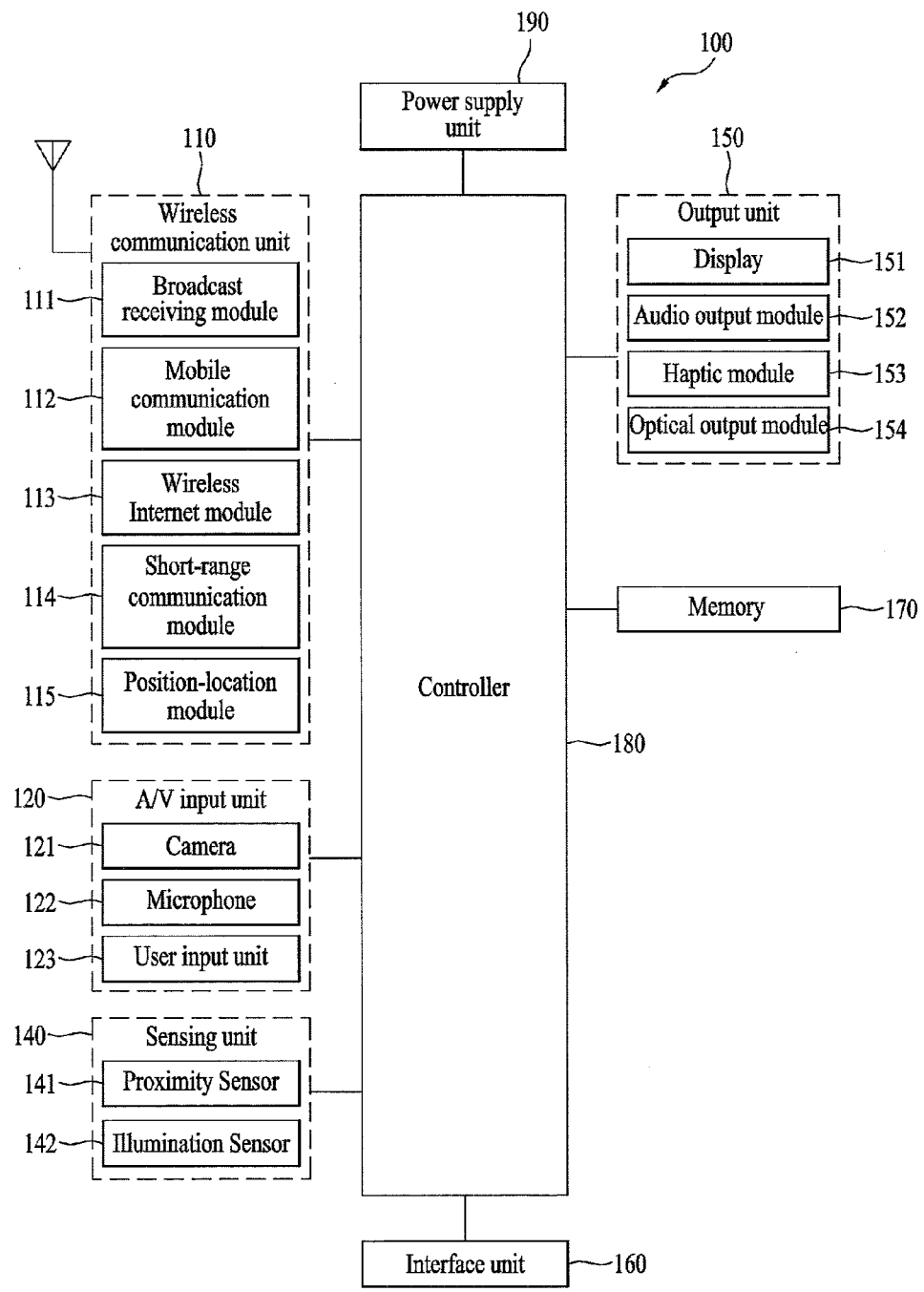
FIG. 1A is a block diagram of a mobile terminal in accordance with the present disclosure.
Figure 1B:
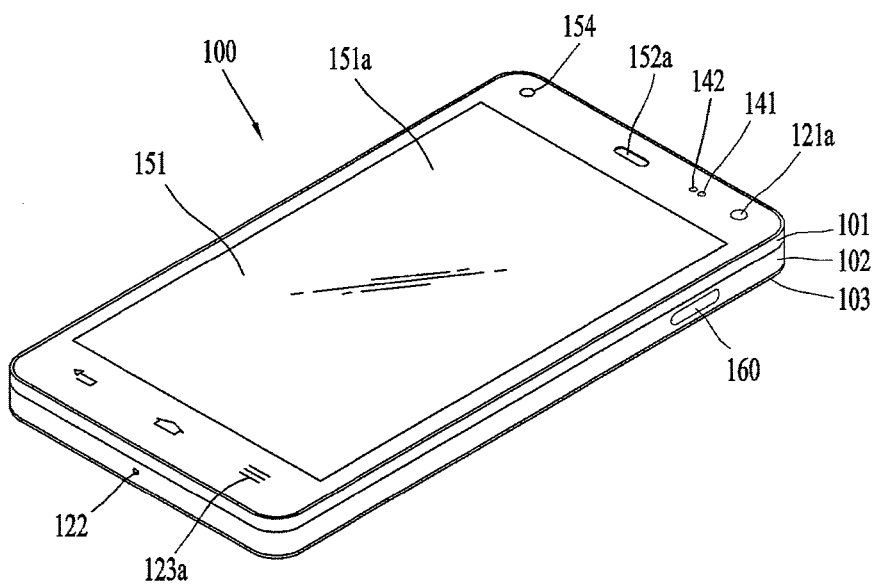
FIGS. 1B and 1C are conceptual views of one example of the mobile terminal, viewed from different directions.
Figure 1C:
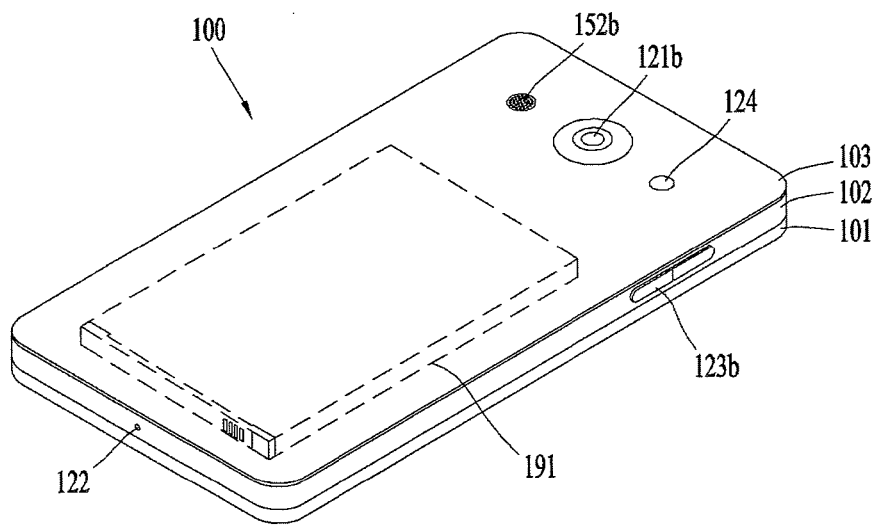

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions. The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

Also included is a system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this instance, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like. A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected. As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101. In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces. The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a. The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170. The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen. As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123. The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121*b* is shown located at the rear side of the terminal body and includes an image capturing direction that is substantially opposite to the image capturing direction of the first camera unit 121*a*. If desired, second camera 121*a* may alternatively be located at other locations, or made to be moveable, in order to have a different image capturing direction from that which is shown.

The second camera 121*b* can include a plurality of lenses arranged along at least one line. The plurality of lenses may also be arranged in a matrix configuration. The cameras may be referred to as an "array camera." When the second camera 121*b* is implemented as an array camera, images may be captured in various manners using the plurality of lenses and images with better qualities.

As shown in FIG. 1C, a flash 124 is shown adjacent to the second camera 121*b*. When an image of a subject is captured with the camera 121*b*, the flash 124 may illuminate the subject. As shown in FIG. 1C, the second audio output module 152*b* can be located on the terminal body. The second audio output module 152*b* may implement stereophonic sound functions in conjunction with the first audio output module 152*a*, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

A communication system which is operable with the variously described mobile terminals will now be described in more detail. Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system. A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites.

Furthermore, the GPS module can acquire speed information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module. The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server. The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database. A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter. In addition to these position location methods, various algorithms may be used to extract (analyze) location information of a mobile terminal. Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

As previously described with regard to FIG. 1A, the mobile terminal may be configured to include short-range communication techniques such as Bluetooth™, Radio Frequency Identification (RFID), Infrared Data Association (IrDA), Ultra Wideband (UWB), ZigBee, Near Field Communication (NFC), Wireless USB (Wireless Universal Serial Bus), and the like.

A typical NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

When the NFC module operates in a card mode, the mobile terminal may transmit card information on a general IC card to the outside. More specifically, if a mobile terminal having card information on a payment card (e.g, a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

When the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P (Peer-to-Peer) mode, the mobile terminal can execute P2P communication with another mobile terminal. In this instance, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

Further preferred embodiments will be described in more detail with reference to additional drawing figures. It is understood by those skilled in the art that the present features can be embodied in several forms without departing from the characteristics thereof. Generally, an image is taken or recorded through a CCTV (closed circuit television) and the image is saved for a prescribed period of time, which needs a considerable amount of maintenance costs. Hence, it is difficult to completely install CCTVs in an area without blind spots despite that the area has a high crime rate.

A black box device installed in a parked car can play a role as a CCTV. Yet, although an image captured by the black box device exists, the existence of the image is not known or a request for the image cannot be made to a user of the black box device. Thus, it is difficult to utilize the captured image.

According to one embodiment of the present invention, a control method of identifying mobile terminals, each of which includes a black box device, and then facilitating black box images to be shared between the identified mobile terminals is provided. Particularly, the black box image sharing is activated by a control method for one user provided with a black box image to make a prescribed payment to another user who provides the corresponding black box image. This is described in detail with reference to the accompanying drawings as follows.

In particular, FIG. 2 is a flowchart illustrating a control method of recognizing terminals including a black box device installed in a parked vehicle, CCTVs and/or the like and establishing a network among the recognized terminals according to one embodiment of the present invention. Referring to FIG. 2, the mobile terminal 100 according to one embodiment of the present invention may be connected to a black box or navigation device mounted on a vehicle. Alternatively, the mobile terminal 100 itself may play a role as the black box or navigation device instead.

In a step S201, the controller 180 of the mobile terminal 100 outputs a map of a parking lot including a plurality of parking spaces. According to one embodiment of the present invention, if it is detected that the mobile terminal 100 enters the parking lot, a map of inside a parking lot is provided. Further, the detection of the entry into the parking lot and the download of the parking lot map can be performed through a communication with a separate terminal provided to the parking lot. Instead of downloading the parking lot map, an indoor image of the parking lot on entering the parking lot inside is photographed through a camera of the mobile terminal 100 or a camera of a terminal (e.g., a black box device, etc.) separately provided to a vehicle and a parking lot map can be configured based on the photographed indoor image. A method of detecting an entry into a parking lot and a method of outputting a parking lot map is not limited by the above-described method. The output of the parking lot map is described in detail with reference to FIG. 3 as follows.

In particular, FIG. 3 is a diagram illustrating one example of a parking lot map 301, which is output when a mobile terminal 100 enters a parking lot, according to one embodiment of the present invention. Referring to FIG. 3 (*a*), the controller 180 can output a parking lot map 301 through the touchscreen 151. In this instance, the parking lot map 301 includes locations of a plurality of parking spaces 302.

In a step S202, the controller 180 can communicate with the black box devices installed in other vehicles. Moreover, the controller 180 can communicate with CCTVs 304 installed in the parking lot. According to one embodiment of the present invention, the controller 180 identifies locations of the black box devices, the CCTV devices 304 and the vehicles (S203). In this instance, the location identification can be performed through the sensing unit 140. For instance, the controller 180 sends a probe signal around the mobile terminal 100, receives a signal in response to the probe signal, and can then identify the location of the corresponding device or vehicle. Moreover, the controller 180 can identify the location of the corresponding terminal by receiving a location information of each of the terminals based on the communication mentioned in the description of the step S202. Regarding the location of the vehicle, the controller 180 identifies the corresponding vehicle based on the captured indoor image of parking lot and can then determine the location of the identified vehicle. Meanwhile, a method of identifying a location of a vehicle or another terminal is not limited by the above-described method.

In a step S204, referring to FIG. 3 (*a*), the controller 180 displays a location 303 of the identified different vehicles and a location of the black box device on the output parking lot map 301. Moreover, the controller 180 can display the location of the recognized CCTV device 304 on the map 301. A method of displaying a location of a black box device is described in detail with reference to FIG. 4 as follows.

Figure 4:
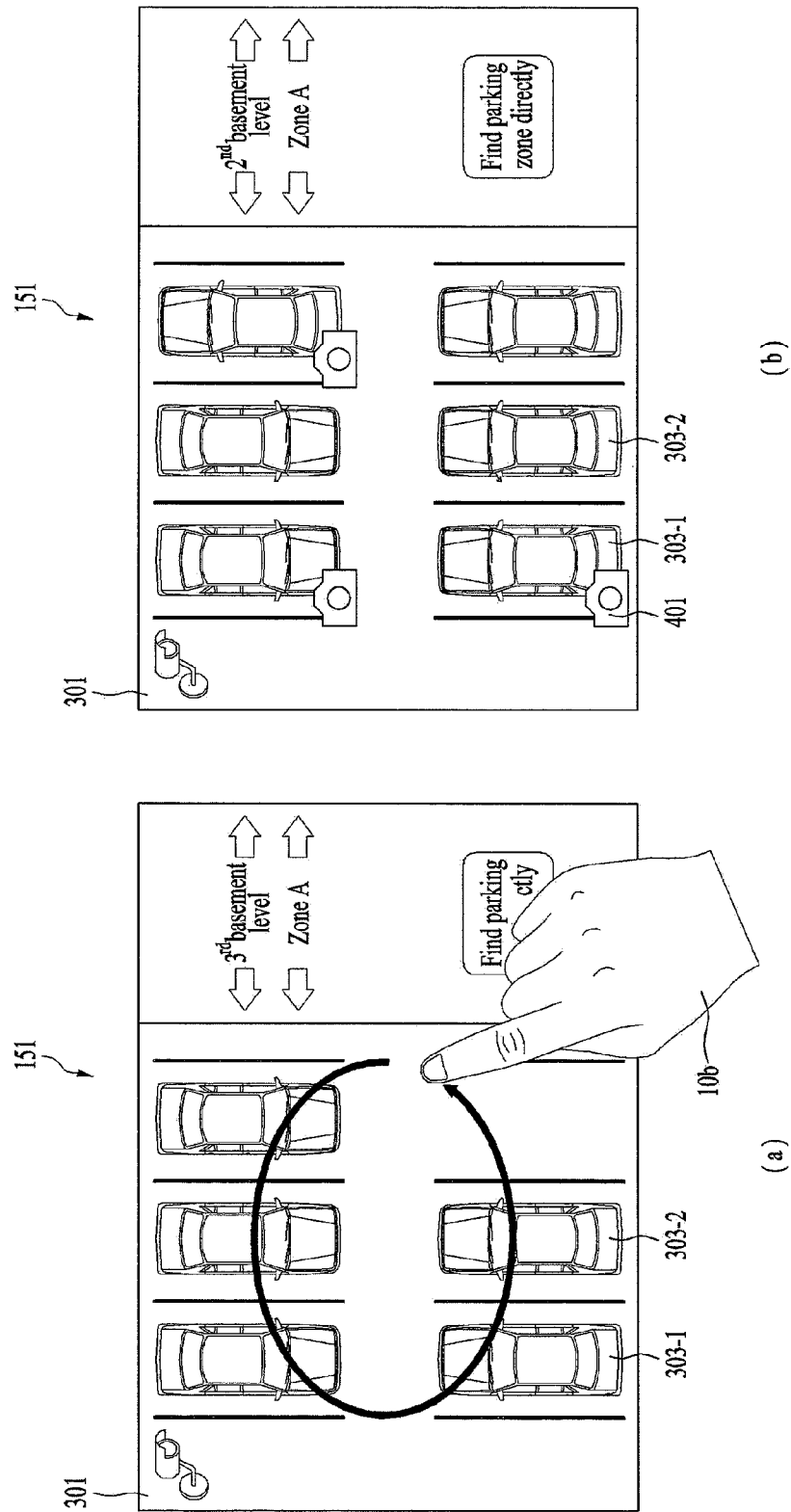
FIG. 4 is a diagram illustrating a control method of displaying a location of a black box device based on a user's touch gesture according to one embodiment of the present invention.

In particular, FIG. 4 is a diagram illustrating a control method of displaying a location of a black box device 401 based on a user's touch gesture according to one embodiment of the present invention. Referring to FIG. 4 (*a*), as mentioned in the foregoing description with reference to FIG. 3, locations of at least one or more vehicles 303-1 and 303-2 can be displayed on the parking lot map 301. If a touch gesture 10*b* for specifying a prescribed area is input, the controller 180 can display a location of the black box device 401 located in the specified prescribed area. Assuming that a black box device is provided to the first vehicle 303-1 and that a black box device is not provided to the second vehicle 303-2, referring to FIG. 4 (*b*), in response to the touch gesture 10*b*, the black box device 401 is marked on the first vehicle 303-1 but no sign is marked on the second vehicle 303-2.

One example of the touch gesture 10*b* for specifying the prescribed area includes an input of drawing a closed curve by a touch drag input, by which the present embodiment is non-limited. Further, according to the embodiment described with reference to FIG. 4, the location of the black box device 401 is displayed based on the touch gesture. Yet, the location of the black box device 401 may be displayed together with the output of the parking lot map 301.

In a step S205, the controller 180 can establish a network among the identified devices. In this instance, the establishment of the network corresponds to a state of exchanging data among the identified devices. In particular, the establishment of the network can be regarded as exchanging captured images among the identified devices in real time (S206). In this instance, the images exchanged in real time can be saved in the memory 170.

As the devices are identified, if the devices are included in the network, the corresponding device can be identifiably displayed. In particular, a device failing to be included in the network yet (or a vehicle equipped with the corresponding device) can be displayed in red on the parking lot map 301 shown in FIG. 3 (*a*). Further, a device included in the network (or a vehicle equipped with the corresponding device) can be displayed in blue on the parking lot map 301 shown in FIG. 3 (*a*). Hence, the device included in the network can be easily recognized.

If the entered parking lot includes a plurality of floors, the controller 180 can display the floor 305 of the currently output parking lot map 301. In this instance, the floor 305 may include a zone. Based on a prescribed touch gesture 10*a*, one floor of the output parking lot map 301 can be switched to another (cf. FIG. 3 (*b*)). In this instance, the prescribed touch gesture 10*a* may include an input of applying a touch to the touchscreen 151 with a pointer and then dragging the pointer in a prescribed direction by holding the touch.

Moreover, according to one embodiment of the present invention, when a map of a parking lot is output, the controller 180 can determine whether a recommended parking zone exists. If the recommended parking zone exists, the corresponding parking zone is displayed. If the recommended parking zone does not exist, to the controller 180 can output a text 306 indicating that the recommended parking zone does not exist. A control method of displaying a recommended parking zone is described in detail with reference to FIG. 5 as follows.

Figure 5:
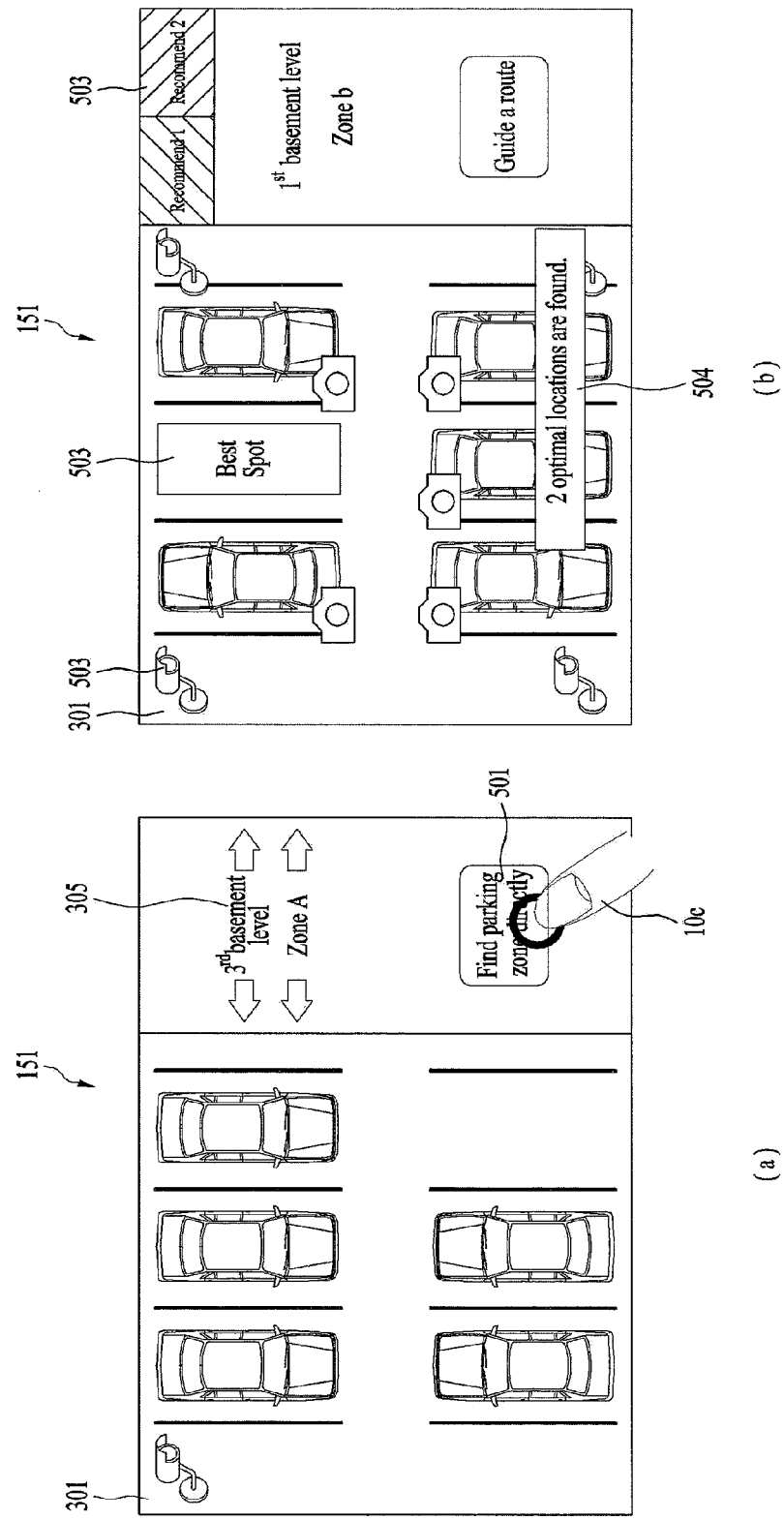
FIG. 5 is a diagram illustrating a control method of displaying a recommended parking space on an output parking lot map according to one embodiment of the present invention.

In particular, FIG. 5 is a diagram illustrating a control method of displaying a recommended parking space on an output parking lot map 301 according to one embodiment of the present invention. Referring to FIG. 5 (*a*), as mentioned in the foregoing description with reference to FIG. 3, a parking lot map 301 is currently output and a floor of a parking lot is represented as the third basement level 305.

If a request for a recommended parking zone is received from a user, the controller 180 determines a vacant space in the output parking lot map 301 and can then display an optimal space among the vacant spaces as a recommended parking space 502. Like the example shown in FIG. 5 (*a*), the recommended parking zone request can include a touch input 10*c* for selecting a prescribed button 501.

According to one embodiment of the present invention, the controller 180 can make the determination of the optimal space based on a shot or capture area of a black box device or a CCTV device. In particular, although there is a vacant parking space, a blind spot in which an image cannot be photographed is not recommended but a parking space in which shooting can be performed through devices as many as possible is determined as an optimal parking space.

Thus, the controller 180 recommends a position for securing an accident image on an occurrence of accident. Therefore, according to one embodiment of the present invention, a parking space having many nearby black box devices 401 or many nearby CCTV devices 304 is determined as an optimal parking space among vacant parking spaces and the determined optimal parking space is displayed as the recommended parking space 502.

Referring to FIG. 5 (*b*), when the recommended parking space 502 is displayed, the controller 180 can also output a text 504 informing a user of the number of the recommended parking spaces. According to one embodiment of the present invention, when a location of a vehicle is displayed on the output parking lot map 301, the location of the vehicle is updated in real time. Such an embodiment is described in detail with reference to FIG. 6 as follows.

Figure 6:
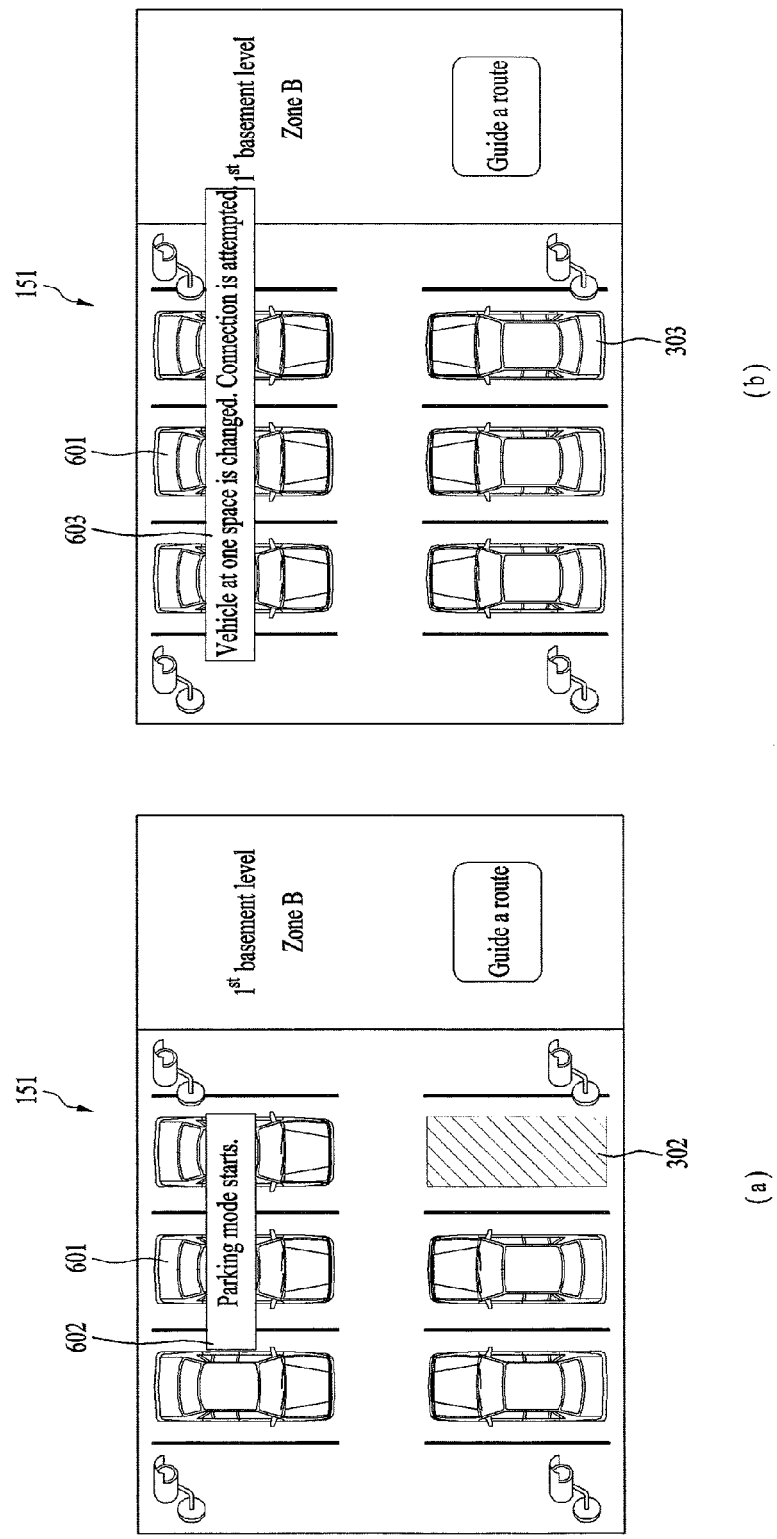
FIG. 6 is a diagram illustrating a control method of updating a location of a vehicle on a parking lot map in real time according to one embodiment of the present invention.

In particular, FIG. 6 is a diagram illustrating a control method of updating a location of a vehicle on a parking lot map 301 in real time according to one embodiment of the present invention. Referring to FIG. 6, while a user's vehicle is parked in a parking lot, another vehicle parked in a nearby parking space may leave the parking space or a new car may enter a vacant parking space. According to one embodiment of the present invention, by saving an identification level of cars parked or leaving per time slot, the controller 180 can provide a parking lot map in a desired time slot to a user.

Referring to FIG. 6 (*a*), the mobile terminal 100 outputs a parking lot map 301 corresponding to a timing point at which a user parks a vehicle. According to the example shown in the drawing, there is a vacant parking space 302 around the user's vehicle 601 and other vehicles are parked around the user's vehicle as well. If the controller 180 detects that an engine of the user's vehicle stopped, the controller 180 switches an operating mode of the mobile terminal 100 to a parking mode and can also output a location of the currently parked vehicle together with the parking lot map 301, as mentioned in the foregoing description. The controller 180 can also output text 602 indicating the parking mode has started.

Referring to FIG. 6 (*b*), if a different vehicle 303 parks in the vacant parking space 302, the controller 180 recognizes the corresponding vehicle and can display a location of the parked vehicle 303 on the output parking lot map 301 by updating the parking lot map 301. Moreover, the controller 180 attempts a connection to the different vehicle 303 and can then control the different vehicle 303 to be included in the aforementioned network. Further, the controller 180 can output a guide text 603 indicating that the connection is currently attempted.

According to one embodiment of the present invention, location and identification information of a vehicle can be saved per time slot in the memory 170 as well as the newly parked vehicle is simply displayed on the currently output parking lot map 301 by updating the map 301, as mentioned in the foregoing description. A control method of reading the vehicle's location and identification information saved per time slot will be described in detail with reference to the accompanying drawings as follows.

First of all, in the step S205 mentioned in the foregoing description, the controller 180 establishes the network among the identified devices. A control method of sharing images on the network is described in detail with reference to FIG. 7 and FIG. 8 as follows. In particular, FIG. 7 and FIG. 8 are diagrams illustrating a control method of sending an image sharing request in case of occurrence of an accident on an established network according to one embodiment of the present invention.

Figure 7:
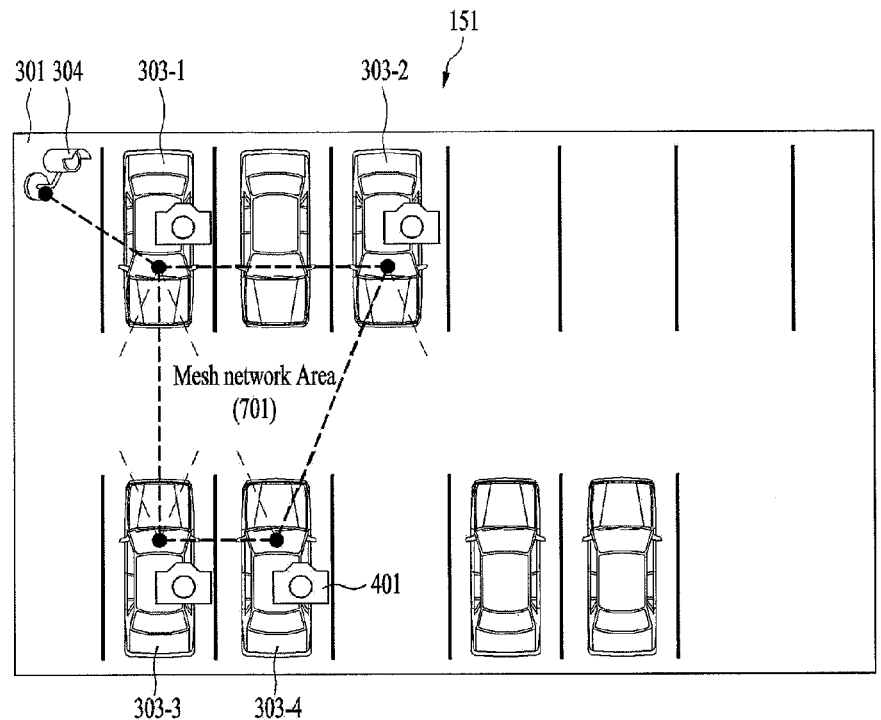
FIG. 7 and FIG. 8 are diagrams illustrating a control method of sending an image sharing request in case of occurrence of an accident on an established network according to one embodiment of the present invention.

Referring to FIG. 7, a parking lot map 301 is currently output through the touchscreen 151. Further, first to fourth vehicles 303-1 to 303-4 and a CCTV device 304 are displayed on the parking lot map 301. Assume that a black box device 401 provided to each of the first to fourth vehicles 303-1 to 303-4 and the CCTV device 304 establish a single network 701 by being identified from each other. Moreover, if a different mobile terminal carried by a passerby approaches, it may be included in the network 701.

A network configured by directly connecting a black box using a low-power wireless communication protocol (e.g., 6LoWPAN (Low-power Wireless Personal Area Network), ZigBee™, Bluetooth SIG (Special Interest Group), etc.) or an IoT (internet of things) dedicated LTE (e.g., LTE-M, etc.) may be appropriate for the network 701.

Figure 8:
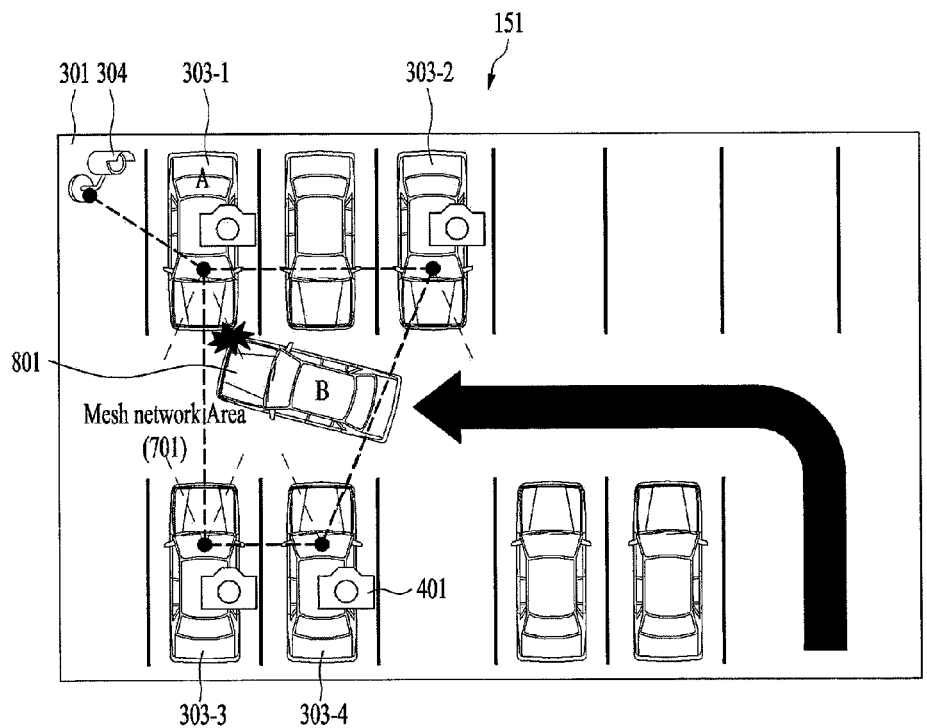

Referring to FIG. 8, assume a situation that a vehicle B 801 hits a parked first vehicle 303-1. A different black box device 401 or a CCTV device 304, which establishes a network 701 with a black box device of the first vehicle 303-1, can share a captured accident image with the first vehicle 303-1 (or the black box device installed in the corresponding vehicle). Moreover, the different black box device 401 or the CCTV device 304 can report the accident occurrence situation by sending the corresponding accident image to a police station server. In this instance, it can be easily determined that there are casualties. Hence, the accident image can be forwarded to a 119 server (or a 911 server) in addition and an emergency rescue request can be made thereto.

According to the embodiment mentioned in the above description, the control method of sharing the image on the output parking lot map 301 is described. According to an embodiment mentioned in the following description, a control method of outputting a parking lot map 301 in a desired time slot and sharing an image with a vehicle parked in the corresponding time slot or sending a sharing request is provided.

After a user has parked a vehicle and left the parking location, if an accident occurs, the user can recognize the accident occurrence later. Particularly, after the user has left the parked location, the user can recognize the accident occurrence. In this instance, if a location of a nearby vehicle can be checked per parking time slot, the user can obtain an accident image by making a request for sharing black box images to the corresponding vehicles. Therefore, according to one embodiment of the present invention, while a user's vehicle is parked, every nearby vehicle that is parked or leaves a parking space is recorded.

Figure 9:
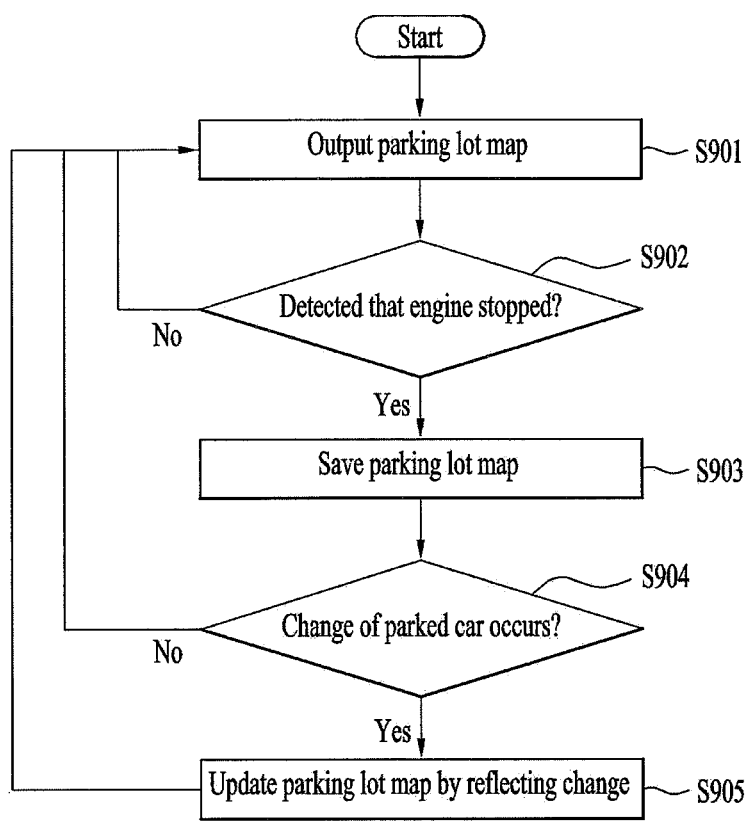
FIG. 9 is a flowchart illustrating a control method of updating a parking lot map by reflecting a change of a vehicle according to one embodiment of the present invention.

In particular, FIG. 9 is a flowchart illustrating a control method of updating a parking lot map by reflecting a change of a vehicle according to one embodiment of the present invention. Referring to FIG. 9, in a step S901, the controller 180 can output a parking lot map 301. According to one embodiment of the present invention, the controller 180 detects that an engine of a vehicle stopped (S902). If it is detected that an engine of a vehicle stopped (Yes in S902), the parking lot map 301 is saved (S903). If the engine of the vehicle keeps running instead of stopping (No in S902), the step S901 is repeated.

In a step S904, the controller 180 detects whether a change occurs in a nearby parked vehicle or a nearby parking space. In this instance, the change of the vehicle or the parking space may mean that a vehicle is parked in the parking space or that a vehicle parked in the parking space leaves the parking space. In a step S905, the controller 180 can update the parking lot map 301 by reflecting the change. The updated parking lot map 301 can be provided to a user through the touchscreen 151 of the mobile terminal 100 or may be saved in the memory 170 per time slot.

In the following description, a control method of outputting a parking lot map 301 corresponding to a set time is described in detail with reference to FIG. 10. In particular, FIG. 10 is a diagram illustrating a control method of receiving a time setting from a user and outputting a parking lot map 301 corresponding to a set time slot according to one embodiment of the present invention.

First of all, according to the embodiment described with reference to FIG. 9, if the change of the parking lot map 301 takes place, the parking lot map 301 is updated by reflecting the change and the updated parking lot map 301 is then saved in the memory 170. The parking lot map 301 saved per time slot can be then provided to a user per time slot.

Referring to FIG. 10 (*a*), first to third vehicles 303-1 to 303-3 are currently displayed on the output parking lot map 301 and a set time input window 1001 is output as well. According to the example shown in FIG. 10 (*a*), a time is set to 18:30. If an input 10*d* for setting a time is applied to the set time input window 1001, the controller 180 searches the memory 170 for the parking lot map 301 mapped to the set time and then outputs the corresponding parking lot map 301.

FIG. 10 (*b*) shows one example of a case that the time is set to 15:30 based on the input 10*d* for setting the time. Referring to FIG. 10 (*b*), it can be observed that the first to third vehicles 303-1 to 303-3 used to be displayed in FIG. 10 (*a*) are not displayed. According to this example, it can be confirmed that the first to third vehicles 303-1 to 303-3 have been parked between 15:30 and 18:30. A control method of making a request for a black box image to a different vehicle on the parking lot map 301 output per time slot is described in detail with reference to FIG. 11 as follows.

In particular, FIG. 11 is a diagram illustrating a control method of making a request for an image to another vehicle on a parking lot map 301 corresponding to a set prescribed time according to one embodiment of the present invention. Referring to FIG. 11 (*a*), a parking lot map 301 corresponding to a time (e.g., 15:30 in the drawing) set by a user is currently output. Further, a prescribed vehicle 303 provided with a black box device 401 is currently displayed.

If an accident occurs around the corresponding vehicle in a set time slot, it is highly possible that an accident image is captured by the black box device of the vehicle. If the corresponding vehicle is located nearby, an image may be downloaded through the network 701 mentioned in the foregoing description. However, after the corresponding vehicle has left the parking lot, it may be impossible to share the image through the network 701. Therefore, according to one embodiment of the present invention, an image requesting message is sent to the corresponding vehicle using an identification information of the corresponding vehicle.

If an input 10e for selecting the prescribed vehicle 303 from the output parking lot map 301 shown in FIG. 11 (*a*) is received, the controller 180 can send a message for making a request for a black box image to the corresponding vehicle. Further, the message 1101 may be sent through the identification information of the corresponding vehicle using a mobile communication network, Internet, or the like. Referring to FIG. 11 (*b*), the controller 180 can output a text 1101 indicating that the message has been set.

A control method of reading an image of a CCTV device 304 per time slot is described in detail with reference to FIG. 12 as follows. In particular, FIG. 12 is a diagram illustrating a control method of reading a shot image per time slot according to one embodiment of the present invention. Referring to FIG. 12 (*a*), a parking lot map 301 corresponding to a time set by a user is output. If an input 10f for selecting a CCTV device 304 displayed on the parking lot map 301 is received, referring to FIG. 12 (*b*), the controller 180 can output a play screen 1201 of a CCTV image corresponding to the set time. Moreover, a black box image may be requested to a vehicle existing on the play screen 1201 as well. Such an embodiment is described in detail with reference to FIG. 13 as follows.

Next, FIG. 13 is a diagram illustrating a control method of sending an image request message to another vehicle in an image in the course of playing a CCTV image or a black box image according to one embodiment of the present invention. Referring to FIG. 13 (*a*), a play screen 1301 of a CCTV or black box image is output through the touchscreen 151. If a prescribed vehicle appears in the play screen 1301, it is highly possible that the corresponding vehicle is temporarily included in the network 701 mentioned in the foregoing description. Hence, according to one embodiment of the present invention, if an input 10g for selecting the vehicle from the play screen 1301 is received, to the controller 180 can send an image sharing request message to the corresponding vehicle.

In this instance, as mentioned in the description of the foregoing case, the controller 180 can send the image sharing request message through the mobile communication network, Internet, or the like based on a vehicle identification information, an identification information of a black box device, or the like. Referring to FIG. 13 (*b*), the controller 180 can output a text 1303 indicating that the message has been set. A control method of requesting images to a plurality of vehicles is described in detail with reference to FIG. 14 as follows. FIG. 14 is a diagram illustrating a control method of sending an image sharing request message to a plurality of vehicles according to one embodiment of the present invention.

Referring to FIG. 14 (*a*), if an accident occurs, the mobile terminal 100 receives a vehicle accident guide notification 1405 from a sensing unit provided to a vehicle, a black box device installed in the vehicle, a navigation device installed in the vehicle and/or the like and can then output the received vehicle accident guide notification 1405.

Referring to FIG. 14 (*b*), if a touch gesture 10h for specifying a specific area on a parking lot map 301 is received, the controller 180 can display a black box device and/or a vehicle located in the prescribed area in a set time interval 1400. If a plurality of black boxes or vehicles exist in the set time interval 1400, the controller 180 can display the number in a badge form 1401 at the corresponding location. Referring to FIG. 14 (*c*), if an input 10j for selecting a full request button 1402 is applied, the controller 180 can collectively send an image sharing request message to the black box devices or vehicles existing in the prescribed area.

Meanwhile, it may be difficult to have cooperation from an image sharer in obtaining a black box image. Therefore, according to one embodiment of the present invention, a control method for an image requester to pay the price for a shared image to an image sharer is provided. Such an embodiment is described in detail with reference to FIG. 15 as follows.

Figure 15:
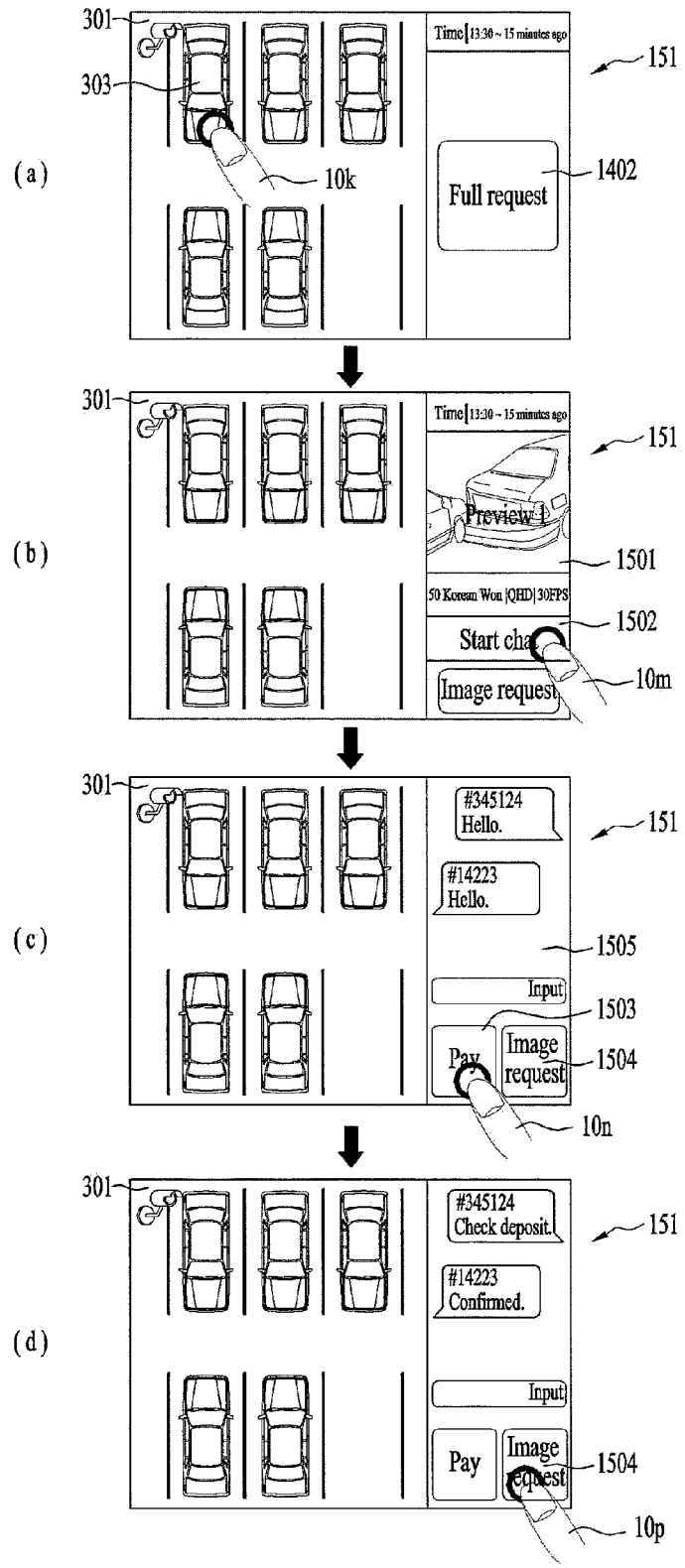
FIG. 15 is a diagram illustrating a control method for an image requester to pay the price to an image sharer according to one embodiment of the present invention.

In particular, FIG. 15 is a diagram illustrating a control method for an image requester to pay the price to an image sharer according to one embodiment of the present invention. Referring to FIG. 15 (*a*), as mentioned in the foregoing description, a parking lot map 301 is currently output and a prescribed vehicle 303 is displayed. If an input 10k for selecting the prescribed vehicle 303 is received, the controller 180 can output a preview screen 1501 of a black box image captured by the corresponding vehicle. In this instance, the preview screen 1501 shown in FIG. 15 (*b*) is the screen to be checked by an image requester before paying the price for an image and may include an image having a resolution lower than that of a real image or an image having a special effect (e.g., mosaic, etc.) applied to a real image. After the image requester has checked the preview screen 1501, the image requester configures a separate session with a terminal of an image sharer by applying an input 10m for selecting a chat start button 1502 and a chat window 1505 can be output (FIG. 15 (*c*)).

According to one embodiment of the present invention, in outputting the chat window 1505, the chat window 1505 is opened using a separate ID without opening personal information (e.g., a phone number, etc.) on a counterpart to each other. The reason for this is to accelerate activation of an image sharing by preventing personal information from being opened in sharing images. In this instance, the ID may include an ID given to each terminal or a temporary ID used in sharing a corresponding image only.

Referring to FIG. 15 (*c*), in response to an agreement to an amount, a sending method and/or the like is made with the image sharer through the chat window 1505, a payment can proceed by pressing a pay button 1503. In particular, if an input 10n for selecting the pay button 1503 is received, the mobile terminal 100 of the image sharer can pay the set amount to the terminal 100 of the image sharer. Further, the payment may be made using a virtual account. Moreover, various payment means (e.g., Mobile Payment, etc.) can be utilized for the payment.

Referring to FIG. 15(*d*), if the payment is completed, the image requester can send a message for making a request for sending an image to the image sharer terminal by selecting an image request button 1504. Meanwhile, a sharer who shares an image may be bothered with an unnecessary image request and the like. Hence, the controller 180 can selectively apply the above-described control method according to one embodiment of the present invention through the pre-settings of the black box device. Setting items are described in detail with reference to FIG. 16 as follows.

Figure 16:
FIG. 16 is a diagram illustrating one example of setting items of a black box constant recording to selectively apply one embodiment of the present invention.

In particular, FIG. 16 is a diagram illustrating one example of setting items of a black box constant recording to selectively apply one embodiment of the present invention. Referring to FIG. 16, the setting items may include at least one of an image quality 1601, an FPS (frame per second) 1602, a data server 1603, a Noti 1604, a location information 1605, a chat setting 1606, a price 1607, a deposit way 1608, a personal information sharing 1609, and a preview offer 1610.

The setting items are described in detail as follows. First of all, the item of the image quality 1601 corresponds to a setting for an image quality of an image in recording a black box image, and the item of the FPS (frame per second) 1602 means the number of frames per second of a recorded black box image.

The item of the data server 1603 corresponds to an item for setting a server to which a black box image will be uploaded, and the item of the Noti 1604 corresponds to an item for setting whether to output a notification for an image sharing request message if an image requester sends the image sharing request message.

Further, the item of the location information 1605 is an item for setting whether to send a shared black box image by having a shot location contained in the shared black box image, the item of the chat setting 1606 is an item for setting whether to open a chat window if an image requester requests to open the chat window, and the item of the price 1607 is an item for presetting a price for a shared black box image. In addition, the item of the deposit way 1608 is an item for setting a payment way.

Also, the item of the personal information sharing 1609 is an item for setting whether to open personal information between an image sharer and an image requester, and the item of the preview offer 1610 is an item for setting a preview image offered to an image requester. The above-listed items are just exemplary, by which one embodiment of the present invention is non-limited.

According to the embodiment described with reference to FIG. 15, a control method for an image requester to make an image sharing request is described. Next, a control method for an image sharer to respond to the image sharing request message is described in detail with reference to FIG. 17 as follows. In particular, FIG. 17 is a diagram illustrating a control method for an image sharer side terminal to share an image according to one embodiment of the present invention.

Referring to FIG. 17 (a), if an image sharing request message is received, the controller 180 can output a notification 1701 of the reception through the touchscreen 151. Referring to FIG. 17 (b), if a command for confirming the notification 1701 is received from a user, the controller 180 can output a preview screen 1702 of a corresponding image and a chat window 1505. In this instance, the chat window 1505 is the same as the former chat window of the embodiment described with reference to FIG. 15.

If it is confirmed that the payment is complete, the user can send the corresponding image by pressing an image send button 1703. In particular, in response to an input for selecting the image send button 1703, the controller 180 can control a corresponding black box image to be sent to a terminal of an image requester side.

Although the embodiment mentioned in the above description is performed within a parking lot, embodiments of the present invention are non-limited by such a place. Embodiments of the present invention applicable by extending a place or time are described in detail with reference to FIGS. 18 to 20 as follows.

Figure 18:
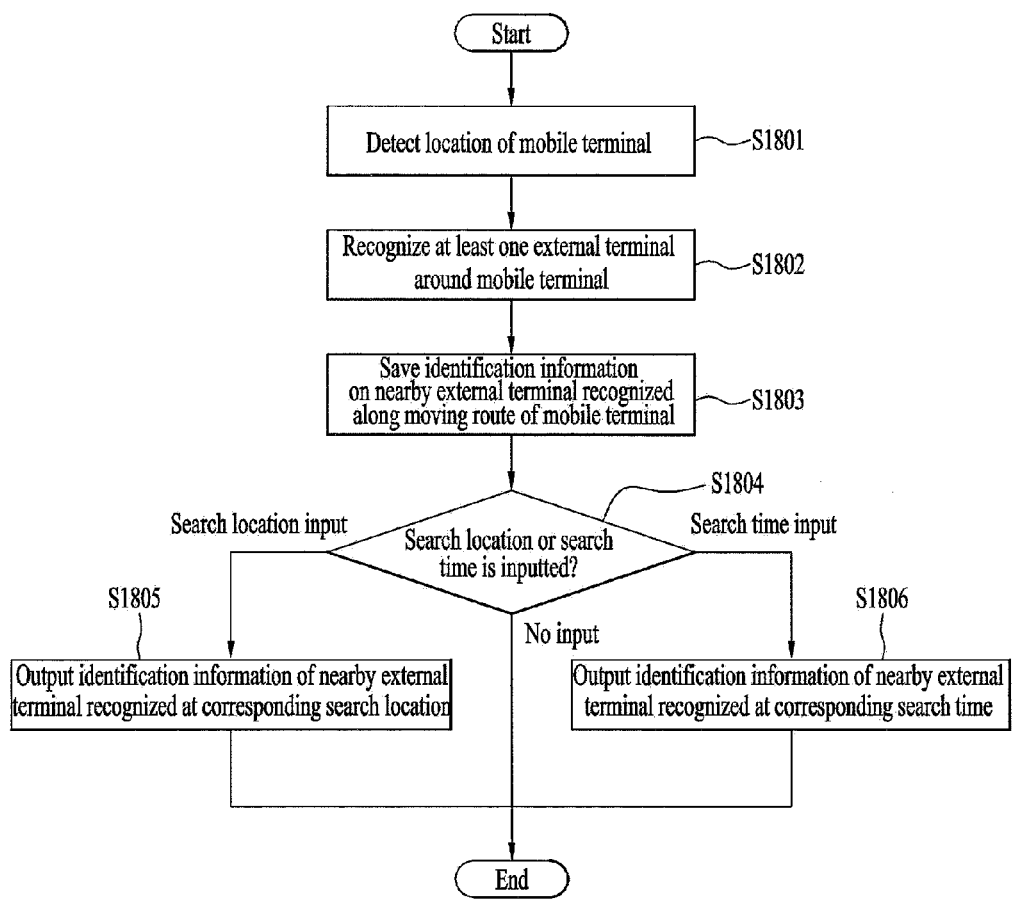
FIG. 18 is a flowchart illustrating a control method of recording a moving route of a mobile terminal and an identification information of a nearby terminal adjacent to the moving route according to one embodiment of the present invention.

FIG. 18 is a flowchart illustrating a control method of recording a moving route of a mobile terminal and an identification information of a nearby terminal adjacent to the moving route according to one embodiment of the present invention. Referring to FIG. 18, considering that an accident may occur in various places as well as in a parking lot, an embodiment of the present invention is provided along a full moving route of the mobile terminal 100. For instance, when a user walking on a street is hit by a car, it is preferable to obtain a photograph or movie of a corresponding scene.

In a step S1801, the controller 180 detects a location of the mobile terminal 100. An operation of detecting the location is represented as a single step. However, the location detecting operation may include a once-only operation or a periodic operation. In addition, it is apparent that a real-time location of the mobile terminal 100 can be detected continuously. Hence, when the mobile terminal 100 is moving, it is possible to check an in-between route as well as a departure/arrival location.

In a step S1802, the controller 180 can recognize at least one nearby external terminal. The recognition in the step S1802 may include a periodic or real-time recognition along a moving route of the mobile terminal 100 as well as a recognition at a prescribed timing point of the mobile terminal 100. One example of such recognition is described in detail with reference to FIG. 19 as follows.

In particular, FIG. 19 is a diagram illustrating a control method of recognizing a nearby external terminal along a moving route of a mobile terminal 100 according to one embodiment of the present invention. Referring to FIG. 19 (a), a location of the mobile terminal 100 is currently displayed on a parking lot map 301. When the mobile terminal 100 is located at a first point on a moving route 1901 (FIG. 19 (a)), the mobile terminal 100 can recognize a CCTV device 304, a first vehicle 303-1, a second vehicle 303-2, a first black box device 401-1 and a second black box device 401-2, which are included in a recognition range 1902.

Subsequently, when the mobile terminal 100 is located at a second point on the moving route 1901 (FIG. 19 (b)), the mobile terminal 100 can recognize the second vehicle 303-2, a third vehicle 303-3, the second black box device 401-2 and a third black box device 401-3, which are included in the recognition range 1902. In particular, while the mobile terminal 100 moves from the first point to the second point, the CCTV device 304, the first vehicle 303-1 and the first black box device 401-1 are out of the recognition range 1902 but the third vehicle 303-3 and the third black box device 401-3 enter the recognition range 1902.

In this instance, the controller 180 can save identification information of a terminal along a moving route like Table 1 in the following.

TABLE 1

|  | first point | second point |
| --- | --- | --- |
| Location information (coordinates) | (x, y) | (x', y') |
| Time | 18:31 | 18:33 |
| Nearby terminal identification information | CCTV ID 1; Black Box ID 1; Black Box ID 2; Car ID 1; Car ID 2; | Black Box ID 2; Black Box ID 3; Car ID 2; Car ID 3; |

Table 1 shows one example of the saving method only, by which the present invention is non-limited. In a step S1803, identification information of nearby external terminals recognized along the moving route of the mobile terminal 100 are saved. In a step S1804, the controller 180 determines whether a search location or a search time is input by a user.

If the search location is input, the routine can go to a step S1805. In the step S1805, the controller 180 can output the identification information (e.g., a list of the identification information, etc.) of the nearby external terminals recognized at the input search location. The input of the search location can be facilitated by touching a prescribed location on the route. Such an embodiment is described in detail with reference to FIG. 20 as follows.

In particular, FIG. 20 is a diagram illustrating a control method of checking a nearby recognized terminal by selecting a prescribed point on a moving path according to one embodiment of the present invention. Referring to FIG. 20 (*a*), the controller 180 can output a moving route 2001 of the mobile terminal 100 together with a map 2000. If an input 10*q* for selecting a prescribed location 2002 on the moving route 2001 is received, referring to FIG. 20 (*b*), the controller 180 can output identification information 2003 on nearby external terminals recognized at the prescribed location 2002. In this instance, the identification information 2003 can be output by being sorted by types 2004-1, 2004-2 and 2004-3 of the respective terminals.

If an input 10*r* for selecting a smartphone item 2004-1 is received, as mentioned in the foregoing description, the controller 180 can send a request signal of an image captured at a corresponding time using the identification information of the smartphone item 2004-1.

Referring again to the flowchart shown in FIG. 18, if the search time is input in the step S1804, the routine can go to a step S1806. In the step S1806, the controller 180 can output the identification information (e.g., a list of the identification information) of the nearby external terminals recognized at the input search time. If no input is applied in the step S1804, the flowchart ends.

Accordingly, embodiments of the present invention provide several advantages. For example, a black box image can be easily shared, and a parking space currently captured by a black box device of a different vehicle can be determined.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

The present invention mentioned in the foregoing description can be implemented in a program recorded medium as computer-readable codes. The computer-readable media may include all kinds of recording devices in which data readable by a computer system are stored. The computer-readable media may include HDD (Hard Disk Drive), SSD (Solid State Disk), SDD (Silicon Disk Drive), ROM, RAM, CD-ROM, magnetic tapes, floppy discs, optical data storage devices, and the like for example and also include carrier-wave type implementations (e.g., transmission via Internet). Further, the computer may include the controller 180 of the terminal. It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
a memory;
a touchscreen;
a wireless communication unit; and
a controller configured to:
cause the touchscreen to display a map of a parking lot including a plurality of parking spaces on the touchscreen when the mobile terminal enters the parking lot,
communicate, via the wireless communication unit, with a plurality of black box devices of a plurality of vehicles parked in the parking lot, wherein each black box comprises at least a controller, a device capturing images, a location identification device, a memory for storing the captured images and the location of the black box, and a wireless communication unit,
identify a location of the plurality of black box devices and a location of the plurality of vehicles parked in the parking lot based on the communication with the plurality of black box devices,
cause the touchscreen to display the identified location of the plurality of black box devices and the identified location of the plurality of vehicles on the map of the parking lot,
when a request for a recommended parking space is received, cause the touchscreen to display at least one vacant parking space in which a number of adjacent black box devices is greater than a predetermined number among a plurality of vacant parking spaces in the map of the parking lot as the recommended parking space based on the identified location of the plurality of the black box devices,
cause the touchscreen to display information indicating a number of recommended parking spaces,
periodically store a plurality of maps of the parking lot including the plurality of black box devices and the plurality of vehicles in the memory per time slot, and the locations of the black box devices,
when an input for setting a search time is received, cause the touchscreen to display the map of the parking lot corresponding to the set search time among the stored maps,
when a location of a specific black box device from the map of the parking lot corresponding to the set search time is selected, transmit, via the wireless communication unit, a black box image sharing request signal to the selected black box device for sharing a black box image with a request to pay for the black box image, and
receive, via the wireless communication unit, and displaying via the touchscreen of the mobile terminal the requested black box image based on completing a payment for the black box image.

2. The mobile terminal of claim 1, wherein the controller is further configured to:
receive an input selecting one of the identified location of the plurality of black box devices,
transmit a request for a black box image from the selected black box device, and
receive and store the requested black box image from the selected black box device.

3. The mobile terminal of claim 1, wherein the controller is further configured to display a route to the recommended parking space on the map of the parking lot.

4. The mobile terminal of claim 1, wherein controller is further configured to display different parking areas or floors of the parking lot on the map in response to a predetermined touch gesture on the touchscreen.

5. A method of controlling a mobile terminal, the method comprising:
displaying, via a touchscreen of the mobile terminal, a map of a parking lot including a plurality of parking spaces when the mobile terminal enters the parking lot;
communicating, via a wireless communication unit, with a plurality of black box devices of a plurality of vehicles parked in the parking lot, wherein each black box comprises at least a controller, a device capturing images, a location identification device, a memory for storing the captured images and the location of the black box, and a wireless communication unit;
identifying, via a controller of the mobile terminal, a location of the plurality of black box devices and a location of the plurality of vehicles parked in the parking lot based on the communication with the plurality of black box devices;
displaying via the touchscreen the identified location of the plurality of black box devices and the identified location of the plurality of vehicles on the map of the parking lot;
when a request for a recommended parking space is received, displaying via the touchscreen at least one vacant parking space in which a number of adjacent black box devices is greater than a predetermined number among a plurality of vacant parking spaces in the map of the parking lot as the recommended parking space based on the identified location of the plurality of the black box devices;
displaying via the touchscreen information indicating a number of recommended parking spaces;
periodically storing a plurality of maps of the parking lot including the plurality of black box devices and the plurality of vehicles in a memory of the mobile terminal per time slot;
when an input for setting a search time is received via the mobile terminal, displaying via the touchscreen the map of the parking lot corresponding to the set search time among the stored maps and the locations of the black box devices;
when a location of a specific black box device from the map of the parking lot corresponding to the set search time is selected via the touchscreen, transmitting via the mobile terminal a black box image sharing request signal to the selected black box device for sharing a black box image with a request to pay for the black box image; and
receiving and displaying via the touchscreen of the mobile terminal the requested black box image based on completing a payment for the black box image.

6. The method of claim 5, further comprising:
receiving an input selecting one of the identified location of the plurality of black box devices;
transmitting a request for a black box image from the selected black box device; and
receiving and storing the requested black box image from the selected black box device.

7. The method of claim 5, further comprising:
displaying a route to the recommended parking space on the map of the parking lot.

8. The method of claim 5, further comprising:
displaying different parking areas or floors of the parking lot on the map in response to a predetermined touch gesture on the touchscreen.

* * * * *